United States Patent
Kuznetsov et al.

[11] Patent Number: 5,881,071
[45] Date of Patent: Mar. 9, 1999

[54] DIGITAL WRITE-AND-READ METHOD AND SIGNAL PROCESSING APPARATUS

[75] Inventors: Alexander Kuznetsov, Moscow, Russian Federation; Masuo Umemoto, Tokyo; Naoya Kobayashi, Musashino, both of Japan; Hideki Sawaguchi, Kodaira, Japan

[73] Assignee: Hitachi, Ltd., Tokyo, Japan

[21] Appl. No.: 812,286

[22] Filed: Mar. 6, 1997

[30] Foreign Application Priority Data

Mar. 15, 1996 [JP] Japan ................................. 8-058754

[51] Int. Cl.$^6$ ................................................. G06F 11/00
[52] U.S. Cl. ........................................... 371/37.01; 360/46
[58] Field of Search .............................. 371/37.01, 37.2, 371/37.5, 38.1, 39.1; 360/46, 48

[56] References Cited

U.S. PATENT DOCUMENTS 5,497,384 3/1996 Fredrickson et al. ................... 371/43

FOREIGN PATENT DOCUMENTS

724998B2 3/1995 Japan .

OTHER PUBLICATIONS

IEEE TRANSACTIONS ON THEORY, vol. 37, No. 3, May 1991, pp. 818–855 (see Specification p. 4).

IEEE TRANSACTIONS ON MAGNETICS, vol. 31, No. 2, Mar. 1995, pp. 1208–1213 (see Specification p. 4).

*Primary Examiner*—Vincent P. Canney
*Attorney, Agent, or Firm*—Kenyon & Kenyon

[57] ABSTRACT

A digital write-and-read method and a signal processing apparatus wherein a write encoder includes a bit distribution circuit for dividing an input data block into n (n: 2 or more) series of bit strings and outputting them in parallel, a first coding circuit for executing predetermined coding for each of data series so distributed and a second coding circuit for converting the output bit series D1 to D3 of the first coding circuit to an n-bit channel code by looking up the previous channel code information, and wherein the second coding circuit executes coding by using a combination having a large Euclidean distance in a partial response equalization output taking inter-symbol interference of at least three bits into consideration as a pair.

41 Claims, 16 Drawing Sheets

| D | S0/C E ;S' | S1/C E ;S' | S2/C E ;S' | S3/C E ;S' |
|---|---|---|---|---|
| 000<br>001 | 000 000;S0<br>110 240;S6 | 010 200;S2<br>100 40-4;S4 | 101 000;S5<br>011 -204;S3 | 010 200;S7<br>001 0-40;S4 |
| 010<br>011 | 010 022;S2<br>100 22-2;S4 | 000 2-2-2;S0<br>110 42-2;S6 | 111 022;S7<br>001 -2-22;S1 | 101 2-2-2;S5<br>011 0-22;S3 |
| 100<br>101 | 001 002;S1<br>111 242;S7 | 011 202;S3<br>101 40-2;S5 | 010 -202;S2<br>100 00-2;S4 | 000 0-4-2;S0<br>110 20-2;S6 |
| 110<br>111 | 011 024;S3<br>101 220;S5 | 001 2-20;S1<br>111 420;S7 | 000 -2-20;S0<br>110 020;S6 | 010 0-20;S2<br>100 2-2-4;S4 |
| D | S4/C E ;S' | S5/C E ;S' | S6/C E ;S' | S7/C E ;S' |
| 000<br>001 | 000 -200;S0<br>110 040;S6 | 010 000;S2<br>100 20-4;S4 | 101 -200;S5<br>011 -40-4;S3 | 111 000;S7<br>001 -2-40;S1 |
| 010<br>011 | 010 -222;S2<br>100 02-2;S4 | 000 0-2-2;S0<br>110 22-2;S6 | 111 -222;S7<br>001 -4-22;S1 | 101 0-2-2;S5<br>011 -2-22;S3 |
| 100<br>101 | 001 -202;S1<br>111 042;S7 | 011 002;S3<br>101 20-2;S5 | 010 -402;S2<br>100 -20-2;S4 | 000 -2-4-2;S0<br>110 00-2;S6 |
| 110<br>111 | 011 -224;S3<br>101 020;S5 | 001 0-20;S1<br>111 220;S7 | 000 -4-20;S0<br>110 -220;S6 | 010 -2-20;S2<br>100 0-2-4;S4 |

D : DATA BIT
S0-S7 : STATE OF THE PREVIOUS CHANNEL CODE
C : SET-PATITIONING CHANNEL CODE
E : EXPECTED OUTPUT AFTER EPR4 EQUALIZATION PROCESSING
S' : STATE OF THE CHANNEL CODE

| D | S0/C E ;S' | S1/C E ;S' | S2/C E ;S' | S3/C E ;S' |
|---|---|---|---|---|
| 00<br>01 | 00 0 0;S0<br>10 2 2;S2 | 00 2 -2;S4<br>10 4 0;S6 | 00 -2 -2;S0<br>10 2 -2;S2 | 00 0 -4;S4<br>10 2 -2;S6 |
| 10<br>11 | 01 0 2;S1<br>11 2 4;S3 | 01 2 0;S5<br>11 4 2;S7 | 01 -2 0;S1<br>11 0 2;S3 | 01 0 -2;S5<br>11 2 0;S7 |

| D | S4/C E ;S' | S5/C E ;S' | S6/C E ;S' | S7/C E ;S' |
|---|---|---|---|---|
| 00<br>01 | 01 -2 2;S1<br>11 0 4;S3 | 01 0 0;S5<br>11 2 2;S7 | 01 -4 0;S1<br>11 -2 2;S3 | 01 -2 -2;S5<br>11 0 0;S7 |
| 10<br>11 | 00 0 -2;S0<br>10 0 2;S2 | 00 0 -2;S4<br>10 2 0;S6 | 00 -4 -2;S0<br>10 -2 0;S2 | 00 -2 -4;S4<br>10 0 -2;S6 |

D : DATA BIT
S0-S7 : STATE OF THE PREVIOUS CHANNEL CODE
C : SET-PATITIONING CHANNEL CODE
E : EXPECTED OUTPUT AFTER EPR4 EQUALIZATION PROCESSING
S' : STATE OF THE CHANNEL CODE

FIG.21
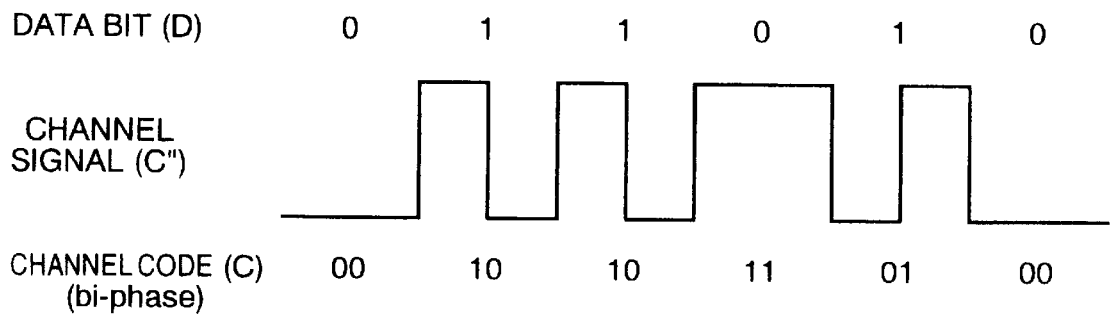
FIG.22
| DATA BIT (D) | CHANNEL CODE (C) PREVIOUSE STATE S0 | EQUALIZATION OUTPUT (E) |
|---|---|---|
| 00 | 00 | 0 0 |
| 01 | 10 | 2-2 |
| 10 | 01 | 0 2 |
| 11 | 11 | 2 0 |
FIG.23
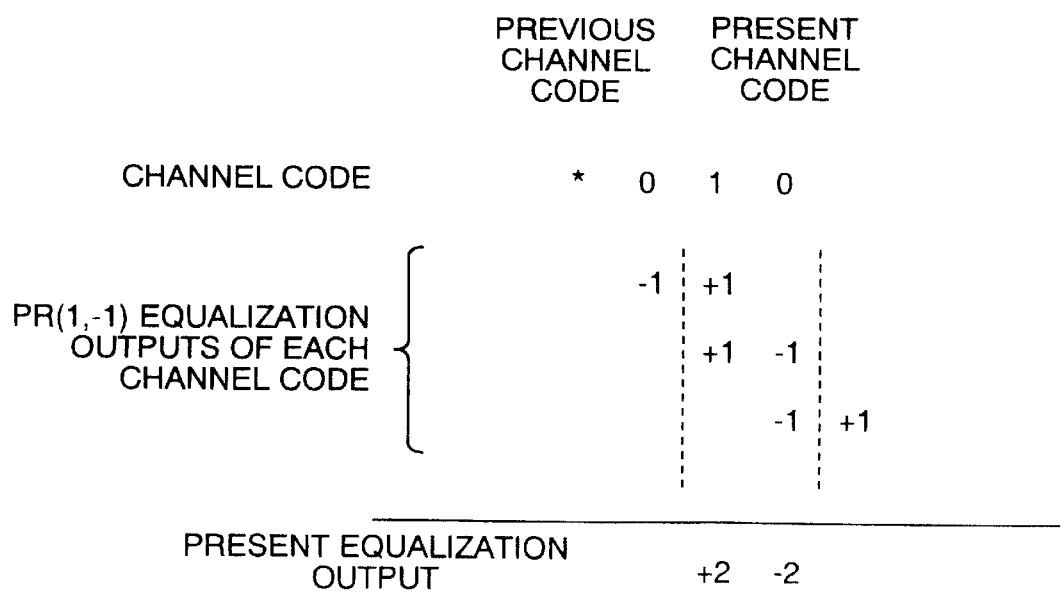

DIGITAL WRITE-AND-READ METHOD AND SIGNAL PROCESSING APPARATUS

BACKGROUND OF THE INVENTION

This invention relates to a digital write-and-read method and an apparatus thereof. More specifically, it relates to a write-and-read method of digital signals which will be suitable for magnetic disk systems for writing digital data in a high density, a signal processing method and an apparatus applying the method.

Recently, requirements for high density recording and high speed operation have become eager for magnetic recording media, particularly those having a diameter of not greater than 3.5 inches. One of the reasons is that large capacity storage systems have mainly shifted to a RAID (Redundant Arrays of Inexpensive Disks) systems and performance of high-end small magnetic disks directly affect system performance.

On the other hand, large scale softwares taking a human interface into consideration such as a GUI (Graphical User Interface) have become inevitably necessary for personal computers as the principal application of small magnetic disks, and the target of a disk capacity in 1995,for example, is said to be about 1 G byte in the case of 2.5-in disk systems.

To satisfy such requirements, two to three 2.5-in disks (recording on four to six surfaces) are necessary in the maximum recording density (800M bit/in.$^2$) at the present product level. To attain such a recording density on one disk (two surfaces), high density recording of about 1.5 G bit/in.$^2$ is necessary.

The operation speed of the personal computers has almost reached 300 MIPS (Million computer Instructions Per Second) in 1995, and a higher operation speed of the small magnetic disk has been required, as well. The write-and-read speed inside the present high-end magnetic disks is 80 to 120M bit/sec.

To support such a progress of the magnetic disks, signal processing technique of the write-and-read systems, too, has made progress to cope with high density recording and high speed recording. As to channel codes, for example, a channel code having a code rate of 8/9 has become predominant from a run-length limited code having a code rate of 2/3. On the other hand, because the length between the adjacent recording bits has become smaller so as to attain high density recording, interference between the signals for each bit has become greater, the specification of the signal-to-noise ratio necessary for playing back and detecting the original recording signals has become higher by a peak-detection method according to the prior art. Therefore, PR4ML (Partial Response class 4 with Maximum Likelihood decoding) system which employs partial response equalization which takes inter-symbol interference into consideration and which can detect maximum likely signal strings from the playback signals has been examined. An LSI for this system has been developed already and are being packaged to products. One of the prior art references associated with this system is U.S. Pat. No. 5,497,384.

In a write-and-read system with greater inter-symbol interference, the equalization method of the partial response must be changed from PR4 to EPR4 (Extended PR4), and along with this change, an ML (Maximum Likelihood decoding) circuit must be made more complexed from the 2-state to the 8-state. In this case, the number of the states may be interpreted as the number of candidates necessary for finding out the most likely signals. The application of the EPR4ML circuit to the magnetic disks is described, for example, in JP-A-7249998.

In high density recording by increasing a track density, on the other hand, the signal-to-noise ratio of the write-and-read system drops. To overcome this drop has become a critical problem. One of the methods for solving this problem is the utilization of trellis codes. Since the ML circuit executes digital processings, its LSI configuration can be attained relatively easily. Therefore, trellis codes can cope with a low signal-to-noise ratio by providing those characteristics which are suitable for the ML processing to the channel codes themselves on the premise of the use of a complicated ML processing.

Since the ML processing deals with the transition state of the codes, that is, a trellis diagram, the channel codes premised on the ML processing are referred to as the "trellis codes". The study of this processing was started in the mid of '80 by researchers of a communication theory and in order to establish a practical channel coding technology, matching with a playback equalization system, limit of the number of continuation of the same codes, counter-measures for error propagation, the removal of DC components, and so forth, have been examined.

For example, "IEEE Transactions on Information Theory", Vol. 37, No. 3, pp. 818–855, 1991 reports a theoretical study of the trellis codes called "MSN (Matched Spectral Null) codes" characterized by the DC-free code, and represents that a bi-phase MSN code having a code rate of 1/2 can be applied to EPR4 equalization. The term "bi-phase code" represents the system which generates a recording signal (C') by causing "10" or "01" to correspond as the channel code (C) to "1" of a data bit (D) and "11" or "00" to "0" of the data bit (D) as shown in FIG. 21 of the accompanying drawings.

Further, "IEEE Transactions on Magnetics", Vol. 31, No. 2, pp. 1208–1213, 1995 reports a tentative production of an LSI for the MSN codes having a code rate of 8/10 on the assumption of PR4 equalization.

To accomplish a large improvement of the signal-to-noise ratio by ML decoding, an Euclidean distance in an equalization output code string of the channel codes must be increased. The square of the Euclidean distance, i.e. dE$^2$, is defined by the following formula between two code strings "u=u$_1$, u$_2$, . . . , u$_n$" and "v=v$_1$, v$_2$, . . . , v$_n$" the with length n.

$$dE^2 = \left( \sum_{i=1}^{n} |u_i - v_i|^2 \right) \tag{1}$$

The received signal is the sum of the original correct decoded value and the noise. When the channel code group having a large dE value is selected in the original equalization output series free from the noise, the influences of the noise on the received signal become weak and the maximum likely codes can be decoded more easily.

One of the methods for holding dE is a so-called "set partition method", which uses a plurality of sets of channel codes holding dE in the equalization output series. FIG. 22 shows an example of this set partition.

In this example, the input data bit D is divided into every 2 bits, and the channel code C is allocated to four kinds of bit patterns ranging from "00" to "11". Each channel code is magnetically recorded on a magnetic disk through a magnetic head and receives PR(1, −1) equalization at the time of playback. The anticipated output by this equalization is represented by symbol E in FIG. 22. In this example, the data D is represented by the sets of two bit patterns, the second bit of which is different.

The channel codes "00" and "10" are allocated to the set of "00" and "01", for example. When the channel codes "00"

and "01" are played back, the PR(1, −1) equalization outputs are given by "0, 0" and "2, −2" and the Euclidean distance $dE^2$ is given by "$2^2 + (-2)^2 = 8$".

FIG. 23 shows the case where the PR (1, −1) equalization output become "2, −2" when the state of the previous channel code is "*0" (where symbol * means that it may be either 0 or 1) and is represented as the state so.

In PR(1, −1) equalization, equalization is so made as to provide a response expressed by "1, −1" to the channel code "1" in consideration of the inter-symbol interference. In other words, this equalization assumes the inter-symbol interference of one other bit in addition to the bit output. The equalization system with little noise emphasis and suitable for magnetic recording can be thus obtained by employing the response system which takes the inter-symbol interference suitable for magnetic recording into consideration. When the channel code is "0", a "−1, 1" response is obtained by the inversion output of "1". The sum of the PR(1, −1) equalization output of each channel code is the equalization output. The output of the channel code as shown in FIG. 23 is "2, −2". The expected outputs can be calculated similarly for other channel codes, and the Euclidean distance can be determined from the difference of the expected equalization outputs of the two channel codes. When the combination of the set partition by PR(1, −1) equalization is considered in this way, its Euclidean distance $dE^2$ is "8".

Similarly, if a set partition having a large Euclidean distance and suitable for EPR4 can be constituted and the trellis codes can be constituted by using the channel code group, channel codes more resistant to the noise than in the prior art system can be constituted. Because EPR4 is the system which takes the 3-bit inter-symbol interference into consideration for the channel codes, however, selection of the channel codes depends not only the input data bit D but also on the previous channel code C. No proposal has yet been made on the construction of the set-partition for EPR4 which takes these points into consideration.

Since the conventional trellis code suitable for EPR4 equalization is based on the bi-phase code, etc., it has a low code rate, whereas the trellis code having a high code rate is not the system suitable for EPR4 equalization.

SUMMARY OF THE INVENTION

It is the first object of the present invention to provide a digital write-and-read method, and system using it, capable of generating trellis codes having a high code rate and a large Euclidean distance suitable for EPR4.

It is the second object of the present invention to provide a digital write-and-read method suitable for high density recording such as small magnetic disks of not greater than 3.5", a signal processing method for digital recording and a circuit apparatus for the method.

It is the third object of the present invention to provide a signal processing circuit for digital recording which can be easily constituted by a CMOS or Bi-CMOS process, for example, by increasing the occupying ratio of a digital signal processing portion for which LSI design can be made relatively easily.

It is the fourth object of the present invention to provide a magnetic write-and-read system suitable for high density recording by employing equalization by EPR4.

To accomplish the objects described above, one of the characterizing features of the digital recording method according to the present invention resides in first coding for increasing a Hamming distance and second coding having the combination of channel codes having a large Euclidean distance.

More concretely, the first coding process of this invention serially distributes digital data to be recorded in such a manner as to constitute n (where n is 2 or more) data series each having an inherent bit length, arranges each of the data series into the same bit length by adding a coding bit or bits to at least one data series having a small bit length, and serially generates an n-bit parallel data by outputting one bit each from the n data series, and the second coding process converts each input data in the n-bit unit obtained by the first coding to an n-bit channel code determined by the bit pattern of the input data and by the state of the channel codes for a plurality of bits that have been converted already.

The conversion rule of the second coding process associates the channel codes in such a manner that a partial response equalization output of each of the channel codes, which takes inter-symbol interference of at least 3 bits into consideration, has a sufficiently large Euclidean distance for each combination of two bit-patterns having a predetermined Hamming distance, for those bit-patterns which the n-bit input data can take.

More concretely, the present invention associates the channel codes so that the partial response equalization output has a Euclidean distance of at least 16, for example, for each set of two bit-patterns having a predetermined Hamming distance at bit positions corresponding to the data series not having the coding bit or at positions corresponding to the data series having the smallest coding bit length.

In the first coding process, the digital data is distributed into three series, for example, so that the data series obtained by adding first coding information having a first bit length to the first data series and the data series obtained by adding second coding information having a second bit length to the second data series have the same bit length as the third data series, respectively, and the coding bit is added to each of the first and second data series.

In this case, a Hamming code corresponding to the digital data distributed to the first data series, for example, is used as the first coding information, and a parity bit corresponding to the digital data distributed to the second data series is used as the second coding information. According to a modified embodiment, a Reed Solomon (RS) error correction code corresponding to the digital data distributed to the first and second data series may be applied to the first coding information. It is further possible to apply a part of a Reed Solomon error correction code corresponding to the digital data distributed to each of the first and second data series as the first coding information, and to apply a parity bit corresponding to the digital data distributed to the second data series and the remaining part of the Reed Solomon error correction code as the second coding information.

Other features of the present invention and features of a write-and-read circuit system will become ore apparent from the following embodiments taken in connection with the accompanying drawings.

BRIEF DESCRIPTION OF THE DRAWINGS

FIG. 4 shows an example of a channel code coding table adapted to EPR4 and provided to a set-partition channel coding circuit 3-6 for executing second coding;

FIG. 21 is a diagram useful for explaining the relationship between data bits and channel codes in digital recording according to the prior art;

FIG. 22 shows a part of a channel coding table associated with second coding in the present invention; and FIG. 23 is a diagram useful for explaining the relationship between a channel code and a playback equalization output.

DESCRIPTION OF THE PREFERRED EMBODIMENTS

Hereinafter, preferred embodiments of the present invention will be explained in detail with reference to the accompanying drawings.

Figure 1:
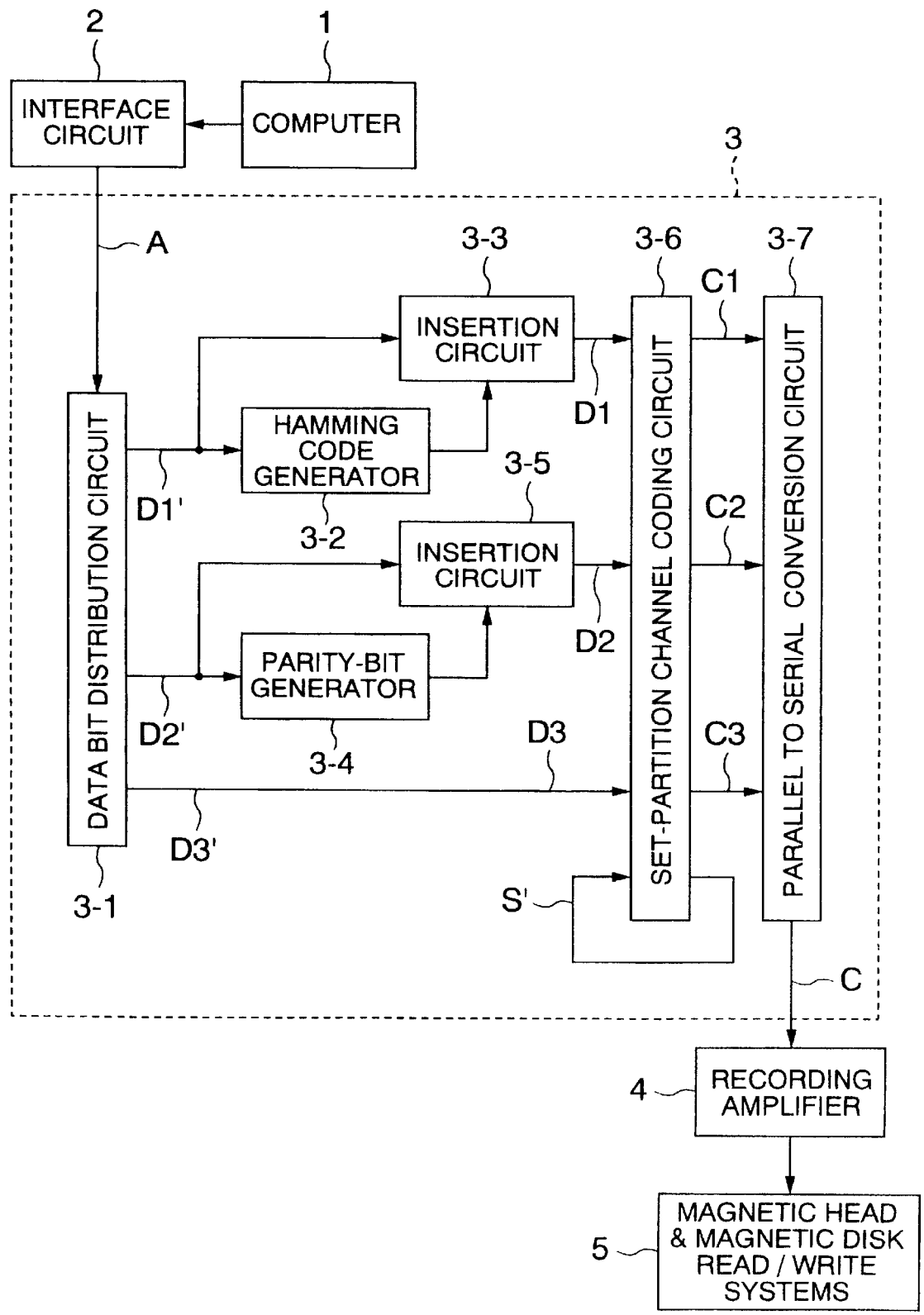
FIG. 1 is a structural view showing an embodiment of a signal processing circuit of a digital signal write system according to the present invention.

FIG. 1 shows a recording circuit system of a digital recording apparatus according to the present invention.

Data outputted from a computer 1 as a host apparatus is inputted to an interface circuit 2 and is then inputted as data A having a form suitable for a channel coder 3 to this channel coder 3. The channel coder 3 converts the input data A to a channel code string C and outputs it to a recording amplifier 4. The output signal of the recording amplifier 4 is inputted to a read/write system 5 including a magnetic head and a magnetic disk, and high density recording is made to the disk.

The channel coder 3 executes two stage of channel coding processings described below.

In the first coding processing, coding for increasing at least a Hamming distance is executed and parallel data of an n-bit unit are sequentially generated.

In the coding processing of the second stage, the n-bit data generated in the first stage is converted to a channel code in accordance with a peculiar conversion rule using the combination of channel codes having large Euclidean distances by a set partition adapted to EPR4.

Coding divided into the two stages is generally referred to as "concatenated coding" and is distinguished from ordinary coding comprising one-stage coding. It is one of the characterizing features of the present invention that the set partition adapted to EPR4 is used for channel coding.

Incidentally, the term "Hamming distance" used herein is represented by the number of pairs having mutually different values among a plurality of signal (bit) pairs at mutually corresponding positions in two codes. In the case of two codes "1100" and "1001", for example, the second bit value and the fourth bit values are mutually different and the Hamming distance in this case is "2". The greater the minimum Hamming distance between the codes, the easier becomes distinction between the codes. Therefore, when the minimum Hamming distance is increased in the first stage coding processing described above, the channel codes suitable for error correction and error detection can be acquired.

In the channel coder 3 shown in FIG. 1, the first stage coding processing is executed by a circuit portion comprising a data bit distribution circuit 3-1, a Hamming code generator 3-2, a parity bit generator 3-4 and two insertion circuits 3-3 and 3-5.

The data bit distribution circuit 3-1 divides the input data A supplied from the interface 2 into three data series D1', D2' and D3' each having an inherent bit length for each recording block of a predetermined size and outputs these data series in parallel with one another.

Figure 2A:
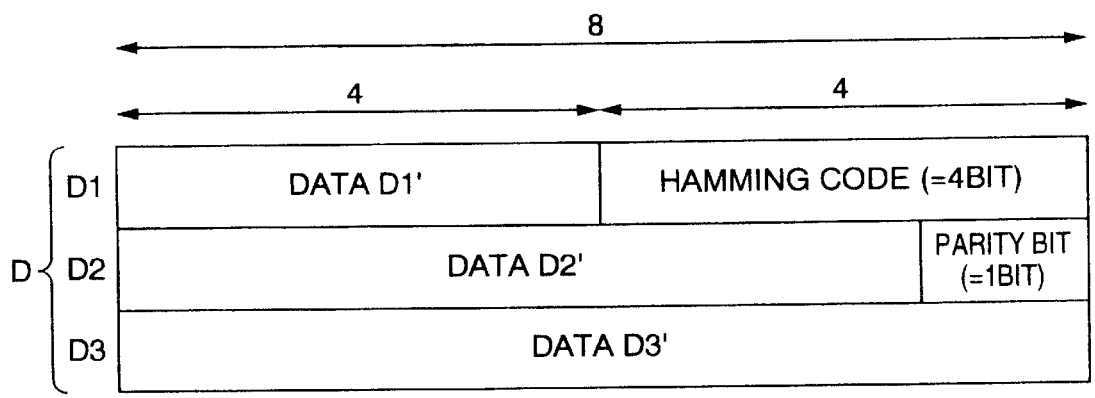
FIG. 2A shows an example of a block construction of concatenated codes obtained by first coding in the present invention.

In this embodiment, the number of bits distributed to each data series is 4 bits for the data series D1', 7 bits for D2' and 8 bits for D3' as shown in FIG. 2A, and input data of 19 bits, in total, are used as one block (recording block) to generate the data series D1', D2' and D3'.

Figure 3:
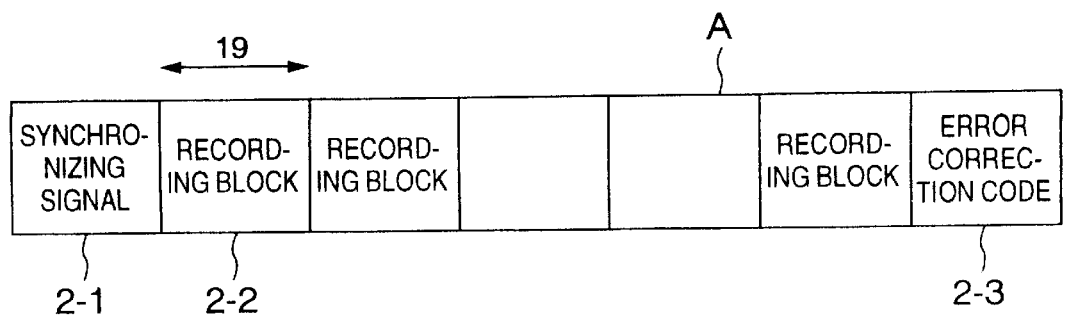
FIG. 3 shows an example of a data block format inputted from an interface 2 to a recording encoder 3.

Incidentally, the interface circuit 2 divides the data supplied from the computer 1 into a plurality of recording units in the 19-bit unit, and a predetermined number of recording blocks 2-2 is gathered as one sector. Further, a synchronizing signal 2-1 is inserted to the leading part of each sector, and the data A in this form is supplied to the channel coder 3. Incidentally, in order to further improve data reliability, it is also possible to execute an inherent error correction coding processing by the interface circuit 2 independently from the channel coding of the data A by the channel coder 3 and to generate a command control of error correction and re-try by the interface circuit by utilizing the error correction code at the time of playback. Reference numeral 2-3 in FIG. 3 denotes the error correction code added to the last of each recording block sector by the error correction coding inherent to the interface circuit.

The data bit distribution circuit 3-1 distributes the data A in a predetermined sequence and generates three data series having different bit lengths.

The data series D1' having a 4-bit length among these data series is inputted to the Hamming code generator 3-2 and to the insertion circuit 3-3. The Hamming code generator 3-2 generates a 4-bit Hamming code as one of the error correction codes in accordance with the content of the 4-bit data of the data series D1'. The Hamming code is added to the end of the data series D1' by the insertion circuit 3-3 as shown in FIG. 2A and consequently, the data series D1 is converted to an 8-bit code series D1 having the Hamming distance "4".

The data series D2' comprises 7-bit data and is inputted to the parity bit generator 3-4 and to the insertion circuit 3-5. The one-bit parity so generated is added to the end of the data series D2' as shown in FIG. 2A. As a result, the data series D2' is converted to an 8-bit code string D2 having the Hamming distance "2".

The data series D3' comprises an 8-bit data and is as such supplied to the second stage coding processing.

Parallel data comprising one bit each of the three data series D1, D2 and D3 in a 3-bit unit is serially supplied to the set-partition channel coding circuit 3-6 of the post stage.

Each coded data block generated by the first coding has a code rate of 19/24=0.79 in this embodiment because 19 bits of the whole 24 bits are input data bits and the remaining 5 bits are coding bits. This value is higher than the code rate of 1/2 in trellis coding corresponding to EPR4 of the prior art.

The second state coding processing is executed by the set-partition circuit 3-6. The set-partition circuit 3-6 converts the three data series D1, D2 and D3 to channel codes suitable for EPR4. The state S' of the channel codes of the previous number bit that have been already converted is taken into consideration in this code conversion.

FIG. 4 shows an example of a conversion coding table 3-6-1 used by the set-partition circuit 3-6 for encoding.

In this table, symbol D represents the bit pattern of the input data serially supplied as 3-bit parallel data comprising one bit each from the three data series D1, D2 and D3. Here, the bit of each of the data series D1, D2 and D3 is shown arranged from the left-hand bit of the three-bit data D. The bit from the data series D1 not containing the coding bit is used as the least significant bit of the input bit pattern D and the input bit pattern is divided into four sets having the Hamming distance of "1" at the least significant bit position (i.e. "000" and "001", "010" and "011", "100" and "101", and "110" and "111"). The recording channel code C is allocated so that a large Euclidean distance can be obtained for the EPR4 equalization output of the channel code after conversion for each set by using eight individual conversion coding tables so prepared as to correspond to the state S0 to S7 of the previous recording channel code.

Incidentally, in FIG. 4, the state S0 corresponds to "000" and S1 does to "001". Similarly, the state S7 corresponds to "111", and "S0/C", for example, represents the code C (=C1 to C3) after conversion when the previous state is "000". Symbol S' represents the new state of the channel code and this becomes the previous state in next coding. In the column of symbol E in FIG. 4, the value of the output signal expected when EPR4 equalization is applied in the playback system after the channel code C is written to the recording medium is illustrated, for reference.

When the three bits of the input data series D1, D2 and D3 and the state S of the previous channel code are given, the channel codes C1, C2 and C3 are outputted from the set-partition channel coding circuit 3-6 comprising memory devices for conversion (not shown). At this time is outputted the state S' of the channel code for the next code conversion operation. The channel codes are serially generated in this way while depending on the previous state to constitute the trellis codes.

Figure 2B:
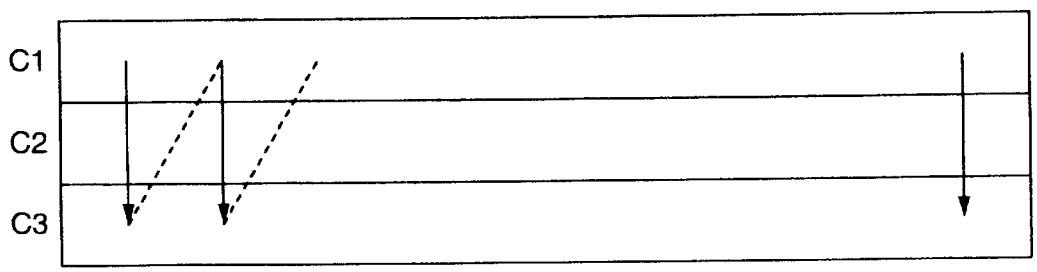
FIG. 2B shows a parallel-serial conversion sequence of the data series obtained by second coding.

The channel codes C1, C2 and C3 outputted from the set-partition channel coding circuit 3-6 are serially converted to the serial signal series C in the sequence represented by an arrow in FIG. 2B and are supplied to the recording amplifier 4.

Figure 5:
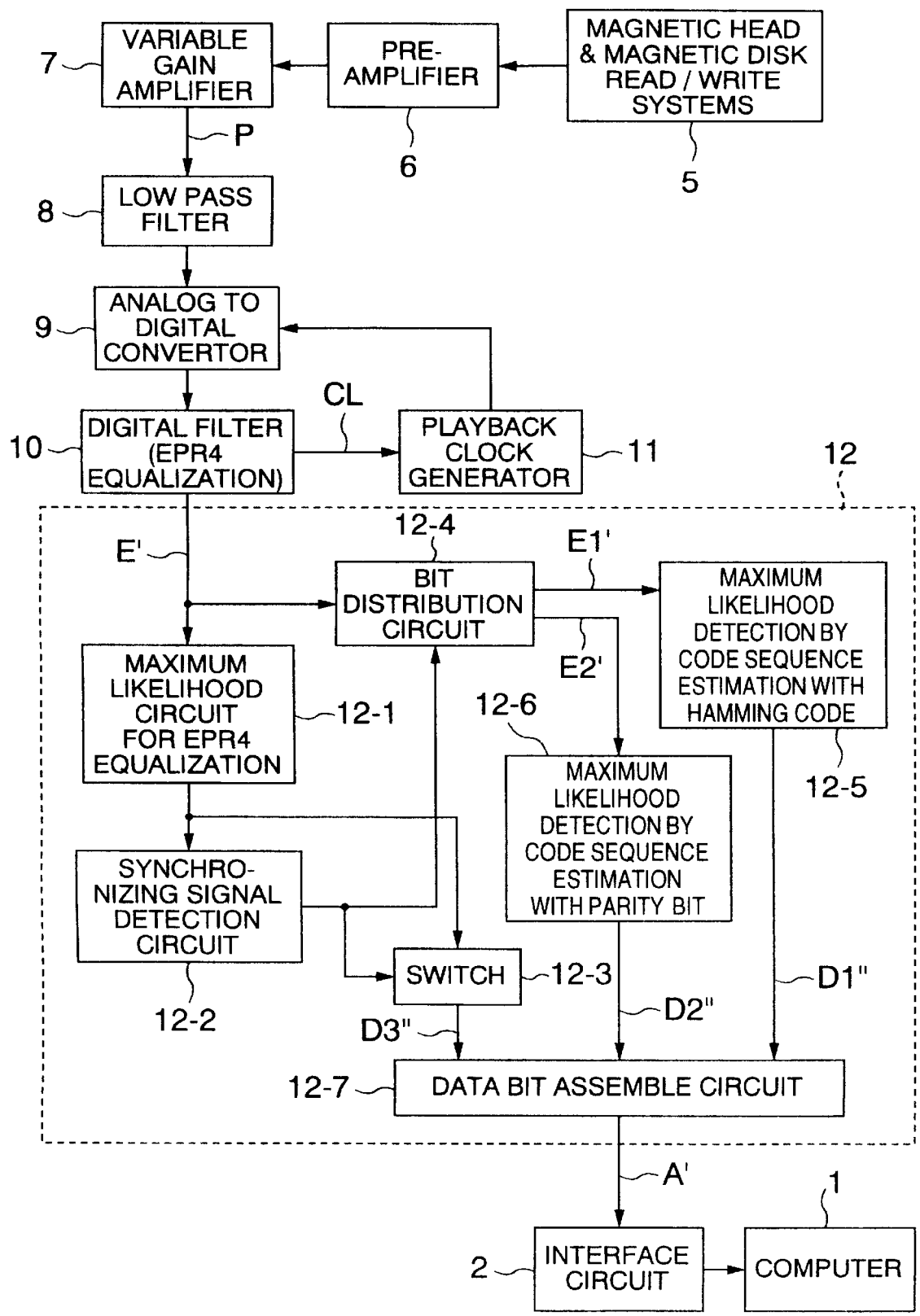
FIG. 5 is a structural view showing an embodiment of a playback and decoding circuit of a digital signal recording system according to the present invention.

FIG. 5 shows an example of a playback decoding circuit suitable for channel coding described above.

A playback signal from a write/read system 5 is amplified by a pre-amplifier 6 and after output signal fluctuation of the write/read system 5 is corrected, it is converted to a signal output P having a predetermined signal amplitude. An unnecessary signal band as a noise component is removed by a low-pass filter 8, the output signal P is converted to discrete digital data by an A/D converter 9 (Analog-to-Digital convertor).

After predetermined pre-processing (generally, PR4 equalization processing) is executed by a digital filter 10, equalization processing of post-processing is applied to the output of the A/D convertor 9 to give an EPR4 equalization output E', which is then supplied to a decoding circuit 12. Incidentally, a clock component of a playback signal is extracted from the digital filter 10 and the signal is inputted as the output signal CL to a playback clock generator 11. The A/D convertor 9 operates in synchronism with the sampling clock generated by the playback clock generator 11.

The decoding circuit 12 converts the EPR4 equalization output E' to a decoded output A' by the following decoding processing. The decoded output A' is inputted to the computer 1 through the interface circuit 2. The interface circuit 2 executes error correction by utilizing the error correction code inserted at the time of recording, and generates a re-try command when an uncorrectable error occurs.

The equalization output E' outputted from the digital filter 10 is supplied in the decoding circuit 12 to an EPR4 ML (Maximum Likelihood) circuit 12-1 and to a bit distribution circuit 12-4. The EPR4 ML circuit 12-1 executes the maximum likelihood processing for the equalization output E' under the state where the noise is superposed in the write/read system, and obtains a decoded output corresponding to the second coding processing described already. The output signal from the ML circuit 12-1 is inputted to a synchronizing signal detection circuit 12-2 and to a switch circuit 12-3 and the synchronizing signal detection circuit 12-2 detects a synchronizing signal at the start of the recording block group. The switch 12-3 selects the decoded output D3' corresponding to the bit string C3 of the channel code by using the synchronizing signal detected by the synchronizing signal detection circuit 12-2 as the reference and supplies it to a data bit assemble circuit 12-7.

The bit distribution circuit 12-4 separates the equalization output E1' corresponding to the channel code C1 and the equalization output E2' corresponding to the channel code C2 from the equalization output E8 with the synchronizing signal being the reference, and outputs them. Since the Hamming code having the Hamming distance "4" is inserted into the equalization output E1' series, a maximum likelihood decoding circuit 12-5 calculates a decoded output D1" having maximum likelihood from the difference between the actual equalization output and an expected output by taking the Hamming distance described above into consideration. In this case, since one recording block comprises eight bits in the C1 series, trellis transition of the $2^8=64$ state is calculated.

Similarly, since the parity bit is inserted into the E2' series, maximum likelihood decoding is executed by the maximum likelihood decoding circuit 12-6 by taking the parity bit into consideration, that is, the Hamming distance "2", to obtain the decoding result D2".

The decoding results D1" and d2" are supplied to the data bit assemble circuit 12-7 in the same way as the result D3", and the bit data is assembled with the data format A' in the reverse sequence to the division operation to the bit string effected at the time of recording by the data bit distribution circuit 3-1, and is outputted to the interface circuit 2.

As can be appreciated from FIG. 4, the channel codes are so allocated in this embodiment so that the Euclidean distance $dE^2$ in the EPR4 equalization output E at the time of playback satisfies at least "16" in all cases in four sets (pairs) of bit patterns of the third data series in which the Hamming distance is not increased and which are only different in the bit value (D3).

In the case of the combination where the values of the second bits (D2) are different such as between "000" and "010", for example, the Euclidean distance $dE^2$ is "$0^2+2^2+2^2=8$" as is obvious from the comparison of the EPR4 equalized output values E of "000" and "022" from the discrete conversion coding table of S0 where the state of the previous channel code is S0, for example. When calculation is similarly made for other combinations, it can be understood that the minimum Euclidean distance $dE^2$ is "8". Incidentally, since the parity bit is inserted into the D2 code series, maximum likelihood decoding which takes this parity bit into consideration, that is, the Hamming distance "2", is possible, and when such maximum likelihood decoding is effected, the distance 16 as the product of the Euclidean distance and the Hamming distance can be obtained for the D2 code series.

Similarly, when the first bit values are different, the minimum Euclidean distance $dE^2$ is "4". For instance, when the conversion results of D="000" and "100" under the S0 state are compared, the channel codes after conversion becomes "000" and "001" and the equalized outputs E become "000" and "002", respectively. Therefore, the minimum Euclidean distance $dE^2$ is "$0^2+0^2+2^2=4$". However, because the Hamming code of the Hamming distance "4" is inserted in the D1 code series, the distance "16" can be acquired as the product of the Euclidean distance and the Hamming distance of the D1 code series when maximum likelihood decoding is effected by taking this Hamming distance into consideration.

Because decoding operation is executed equivalently at the distance "16" according to the present invention as described above, a high reliability write/read signal processing hardly affected by the noise can be conducted, and because the code rate is as high as about 0.8, recording can be made at a high speed and in a high density.

Next, another embodiment of the present invention will be explained.

To simplify the circuit construction of the channel coder 3 described above, the data series D outputted in parallel from the distribution circuit 3-1 may be divided into two series.

Figures 6, 7:
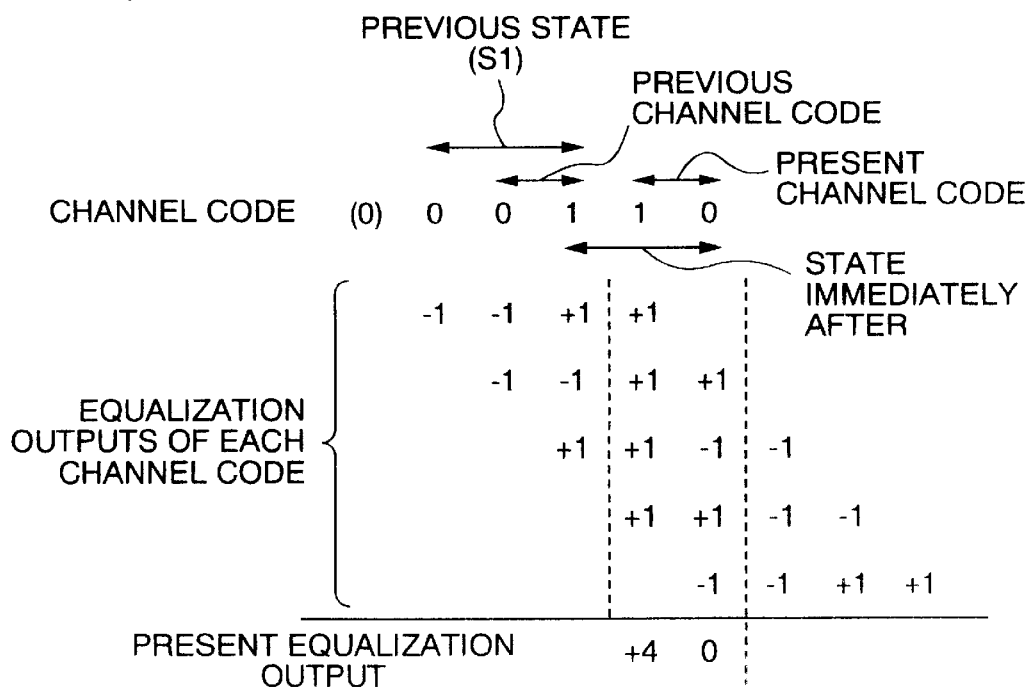
FIG. 6 shows another example of the channel code coding table provided to the set-partition channel coding circuit 3-6 for executing second coding.
FIG. 7 is a diagram useful for explaining an example of an equalization output of the channel code in the embodiment shown in FIG. 6.

FIG. 6 shows an example of the conversion coding table used by the set-partition channel coding circuit 3-6 for second stage coding when the data series D outputted in parallel from the distribution circuit 3-1 is divided into two series.

As described already, the EPR4 equalization is based on the assumption that inter-symbol interference exists in three bits other than the bit as the coding object. Therefore, when the data series D is divided into two series and second stage coding is effected in two-bit unit, too, the previous state Sn (n=0 to 7) is divided into eight state in the same way as in FIG. 4. Symbols other than D in FIG. 6 have the same meaning as those in FIG. 4.

FIG. 7 shows an example of the EPR4 equalization output corresponding to FIG. 6 in which the channel codes are designated in the 2-bit unit.

FIG. 7 shows the case where the previous channel code is "01", the later half bit of the preceding channel code is "0", the state of the previous consecutive three bits is "001" (S1 state) and under such a state, the data bit is "01". From the conversion coding table of FIG. 6 is selected "10" as the channel code, and the EPR4 equalization output is "4, 0". As can be appreciated from FIG. 6, when the second state coding processing is executed in the 2-bit unit, the Euclidean distance between the channel codes in the equalization output becomes smaller than when it is executed in the 3-bit unit.

Figure 8:
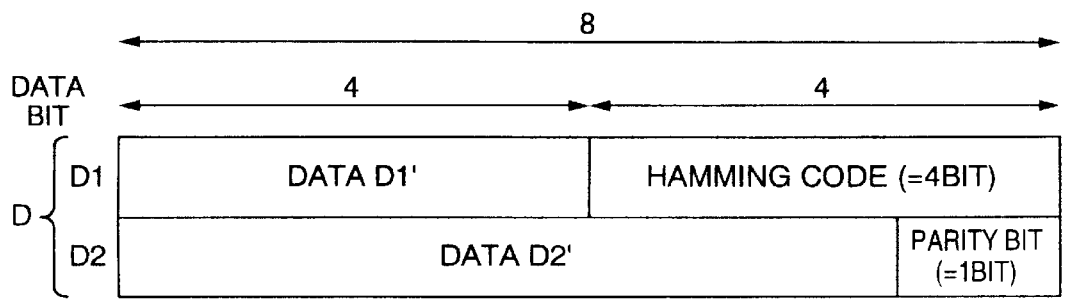
FIG. 8 shows another example of the block structure of the concatenated codes obtained by first coding.

In this case, the distance "16" equivalent to that of FIG. 2 can be obtained by constituting the data series into the data block construction wherein the parity bit is added to the data series string D2' and the Hamming code is added to the data series D1', as shown in FIG. 8. Incidentally, as can be appreciated from FIG. 8, the code rate is "(4+7)/16=0.6875" and is therefore lower than the code rate in FIG. 2.

Figure 9:
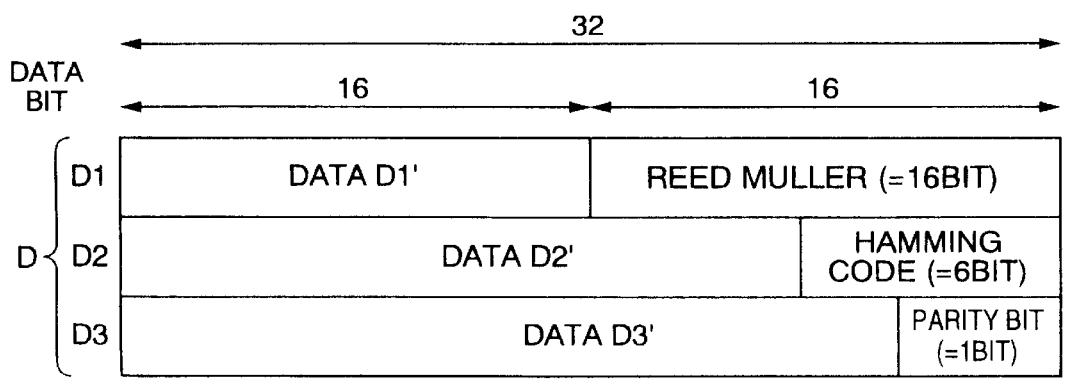
FIG. 9 shows still another example of the block structure of the concatenated codes obtained by first coding.

FIG. 9 shows the data construction wherein the distance is further increased in the coded data block comprising the three data series shown in FIG. 2.

In this example, the equivalent distance is set to "32" by inserting the parity bit to the data series D3', coding the data series D2' by the Hamming codes and coding the data series D1' by Reed Muller codes.

Figure 10:
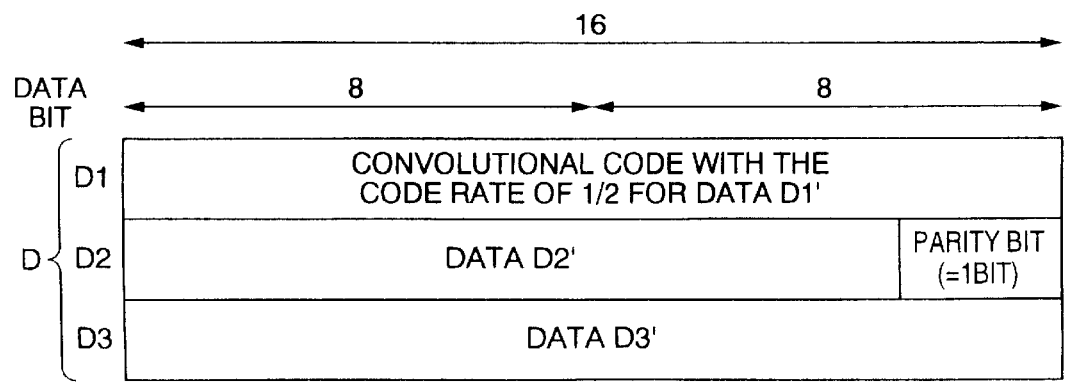
FIG. 10 shows still another example of the block structure of the concatenated codes obtained by first coding.

FIG. 10 shows the case where a convolutional code is utilized as the error correction code added to the data series D1' as a modified example of the coded data block described above. Since the coding ratio of the convolutional code is 1/2, the code rate of concatenated coding becomes high to "(8+15+16)/(16×13)=0.815".

The description given above explains the concatenated coding by the combination of the set-partition channel coding corresponding to EPR4 with various error correction codes. When these concatenated codings are applied, the principal circuit elements of the playback circuit are the maximum likelihood decoding circuits 12-5 and 12-6 for executing the decoding processing in consideration of the Hamming distance of the error correction code from the bit series of the equalization output as shown in FIG. 5. The greater the data quantity of one recording block, the greater becomes the number of states required for these maximum likelihood decoding circuits 12-5 and 12-6. Therefore, the circuit construction shown in FIG. 5 is particularly effective when the size of each recording block is small.

Figure 11:
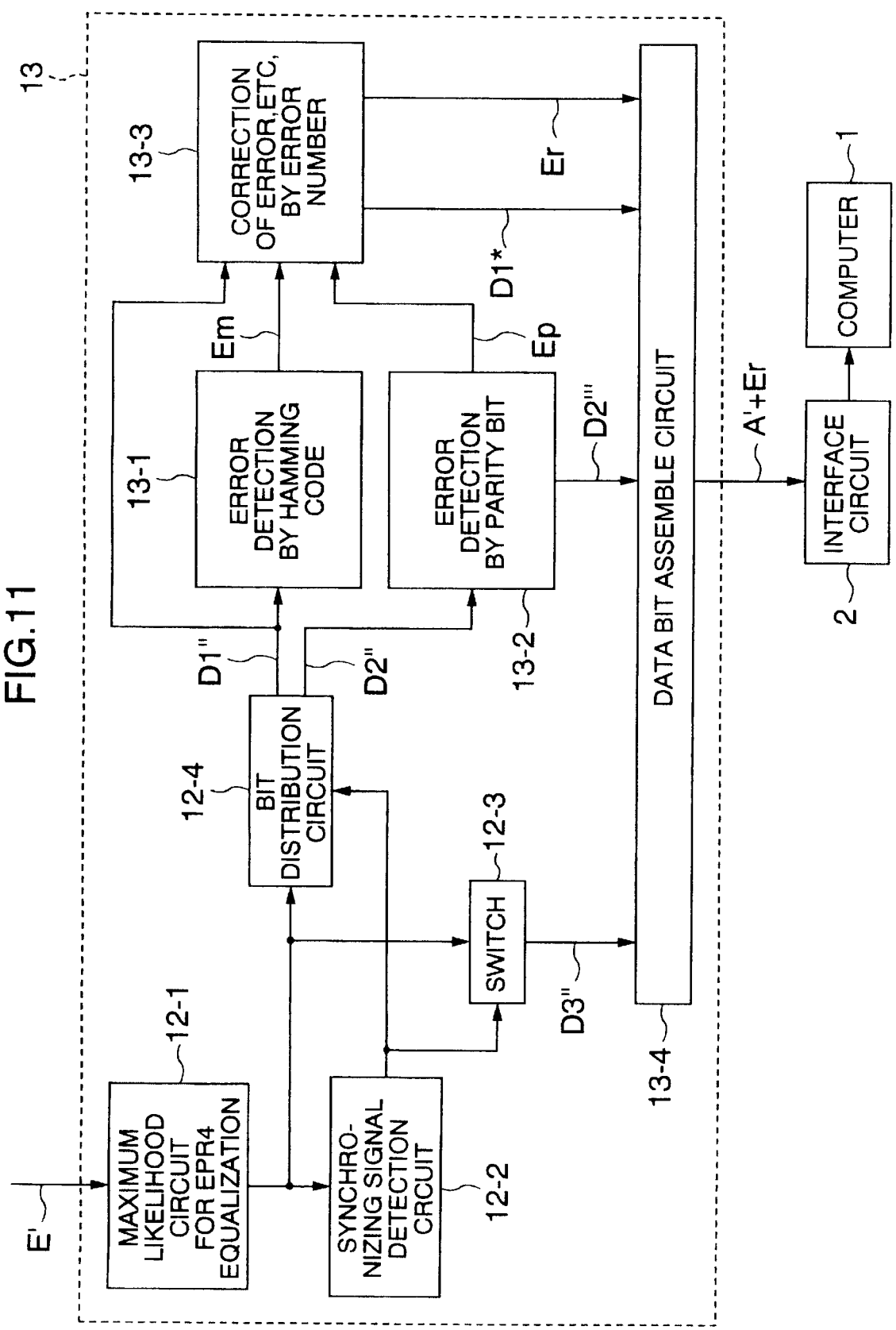
FIG. 11 shows another example of the playback decoding circuit.

FIG. 11 shows an example of decoding circuit 13 which is effective for the coded data block having a structure shown in FIG. 2 and which can simplify the circuit construction though decoding performance becomes somewhat lower in comparison with the decoding circuit 12 shown in FIG. 5.

Like reference numerals will be used to identify like constituents as those of the decoding circuit shown in FIG. 5 and the explanation of the circuit portions having the same function will be omitted. Among the tentative decoding results obtained by the EPR4ML circuit 12-1, the embodiment shown in FIG. 2 utilizes only the data series D3' but this embodiment utilizes the data series D1' and D2', too.

The bit distribution circuit 12-4 selects the tentative decoded results D1" and D2" from the output of the ML circuit 12-1 on the basis of the synchronizing signal outputted from the synchronizing signal detection circuit 12-2. The tentative decoded result D1" is inputted to the error detection circuit 13-1 by the Hamming code and to the error correction processing circuit 13-3 while the tentative decoded result D2" is inputted to the error detection circuit 13-2 by the parity bit.

The tentative decoded results D1" and D2" are binary signals and their operation can be executed by a binary logical formula. Therefore, the circuit scale of the error detection circuits 13-1 and 13-2 may be small. The error correction processing circuit 13-3 applies the operational processing inclusive of error correction to the tentative decoded result D1" in accordance with the values Em and Ep detected by the error detection circuits 13-1 and 13-2 and removes the Hamming code. The data series D1* corrected in this way is outputted to the data bit assemble circuit 13-4. On the other hand, the error detection circuit 13-2 outputs the data string D2" after the removal of the parity bit to the data bit assemble circuit 13-4.

Figure 12:
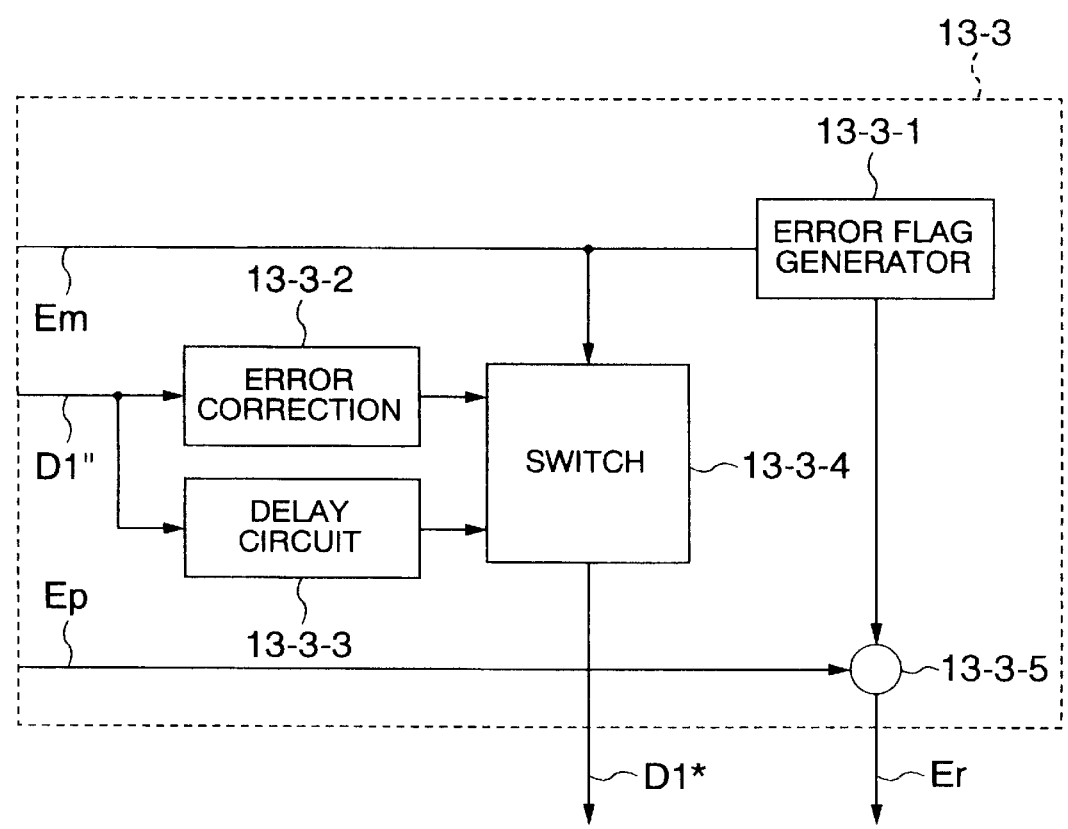
FIG. 12 shows the detail of an error correction circuit in FIG. 11.

FIG. 12 shows the detail of the error correction processing circuit 13-3 described above.

The basic concept of the error processing in the error processing circuit 13-3 resides in that the error is corrected if the number of errors is small and an error flag Er representing that the errors exist in a given recording block is generated if there are large number of errors. The decoded data D1* of the recording block and the error flag Er are applied to the interface circuit 2 through the data bit assemble circuit 13-4, and the interface circuit 2 executes the operational processing such as the error correction processing for a plurality of recording block by using the error flag Er. If the error flag Er exists, code error correction can be made more efficiently than random error correction processing when the error flag does not exist.

The error correction processing circuit 13-3 executes the error correction processing by the Hamming code by the error correction circuit 13-3-2 for the tentative decoded data D1". During this error correction processing, the tentative decoded data D1" is delayed by a delay circuit 13-3-3, and is inputted to a switch 13-3-4 at the same timing as the error correction result. The switch 13-3-4 selects either one of the error correction result and the output of the delay circuit in accordance with the number of the error detection results Em by the Hamming code, and outputs the selection result as the decoded data D1*. Incidentally, since there is the possibility that the error correction processing is applied to the output signal D1* of the switch 13-3-4, it is represented by D1* and is distinguished from D1".

When the error is only one, the switch 13-3-5 selects the error correction output, and selects the delay circuit output at other times. The error flag generator 12-3-1 generates the error flag representing that the error exists in the recording block, in accordance with the error detection result Em by the Hamming code. Since the existence of any error can be detected by the parity bit in the data series D2", the error flag is generated when any parity error exists, too. Therefore, an adder 13-3-5 adds the output of the error flag generator 13-3-1 to Ep and outputs the addition result as the error flag Er.

Figure 13:
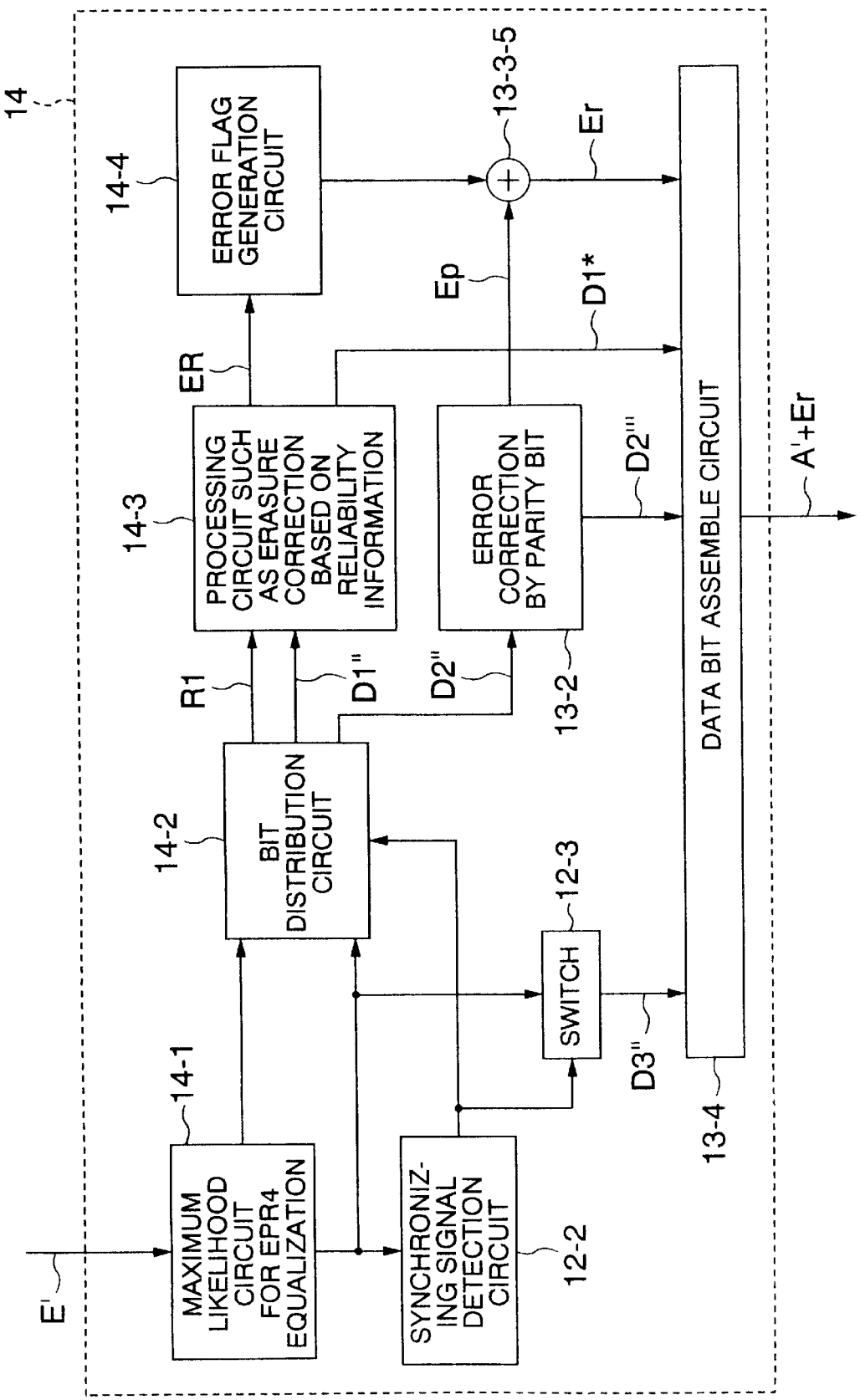
FIG. 13 shows still another example of the playback decoding circuit.

FIG. 13 shows an embodiment of a decoding circuit 14 equipped with an intermediate function of the decoding functions shown in FIGS. 11 and 5.

The basic concept in this case resides in that the tentative decoded output is obtained by the maximum likelihood decoding circuit 14-1 and the difference between an equalization output which is originally expected and an equalization output which is actually obtained, that is, the information representing data reliability for the tentative decoded output, for each decoded output. Error correction of the D1 series can be efficiently conducted by utilizing this data reliability information. Incidentally, the same reference numerals are used in FIG. 13 to identify the same constituents as in FIGS. 5 and 11, and the explanation on the constituents having the same function is omitted.

The bit distribution circuit 14-2 extracts the tentative decoded results D1" and D2" from the output of the ML circuit 14-1 on the basis of the synchronizing signal and acquires the reliability information R1 on D1" from the EPR4ML circuit 14-1. The reliability information R1 and the tentative decoded result D1" are supplied to the processing circuit 14-3, and this processing circuit 14-3 executes the error correction processing by using the reliability information R1 for the tentative decoded result D1".

Figure 14:
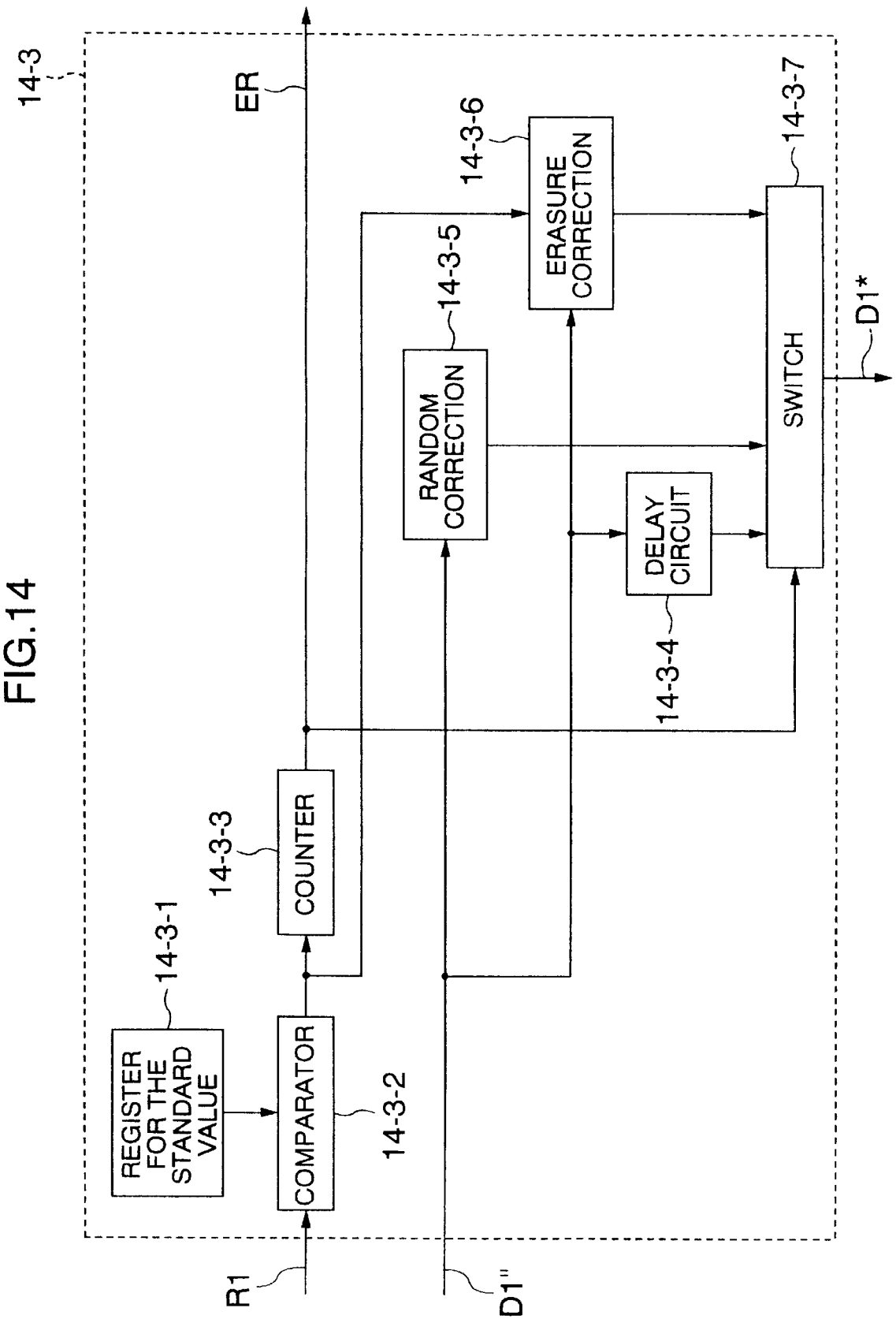
FIG. 14 shows the detail of the error correction circuit in FIG. 13.

FIG. 14 shows the detailed circuit construction of the processing circuit 14-3 described above.

The reliability information R1 is compared with a reference value set to a reference value register 14-3-1 by a comparator 14-3-2, and the number of the decoding results having lower reliability than the reference value is counted by a counter 14-3-3. On the other hand, the tentative decoded result D1" is inputted to a random correction circuit 14-3-5 and the error correction operation by the Hamming code is executed. The tentative decoded result D1" is inputted in parallel with the above to an erasure correction circuit 14-3-6 and to a delay circuit 14-3-4. The erasure correction circuit 14-3-6 detects the position of the decoding result having lower reliability from the output of the comparator 14-3-2 and executes the error correction operation processing of the Hamming code for the tentative decoded result D1" on the basis of this position information.

The output of the random correction circuit 14-3-5, the output of the erasure correction circuit 14-3-6 and the output of the delay circuit 14-3-4, which has a delay time corresponding to the operation delay time of these correction circuit, are inputted to the switch 14-3-7, and the decoding result selected appropriately in accordance with the number of the low reliability decoding results outputted from the counter 14-3-3 becomes the output D1*. When the count value outputted from the counter 14-3-3 is not greater than "1", for example, the output of the random correction circuit 14-3-5 is selected and when it is "2 to 3", the output of the erasure correction circuit 14-3-6 is selected. The output of the delay circuit 14-3-4 is selected at other times.

The output ER of the counter 14-3-3 is inputted to the error flag generator 14-4 shown in FIG. 13, and this circuit 14-4 generates the flag if any error exists in this recording block. The output of the error flag generator 14-4 and the output of the error detection circuit 13-2 by the parity bit are added by the adder 14-5 and the error flag Er is outputted when the error occurs in either of the series D1 and D2.

The foregoing embodiments are based on the concatenated codes shown in FIG. 2 and execute the mutually independent encoding operation such as the error correction coding for the three bit series D1, D2 and D3. If higher efficiency is required even at the sacrifice of the circuit scale, error correction coding can be executed for a plurality of data series as will be described below.

In the coded data blocks shown in FIGS. 15A and 15B, the data series D3' and D2' are the same as those of FIG. 2, and a characterizing feature resides in that the error correction code added to the data series D1' is the Reed Solomon error correction code (hereinafter abbreviated as "RS" code) calculated from the information bits of the data series D1' and D2'.

Figure 15A:
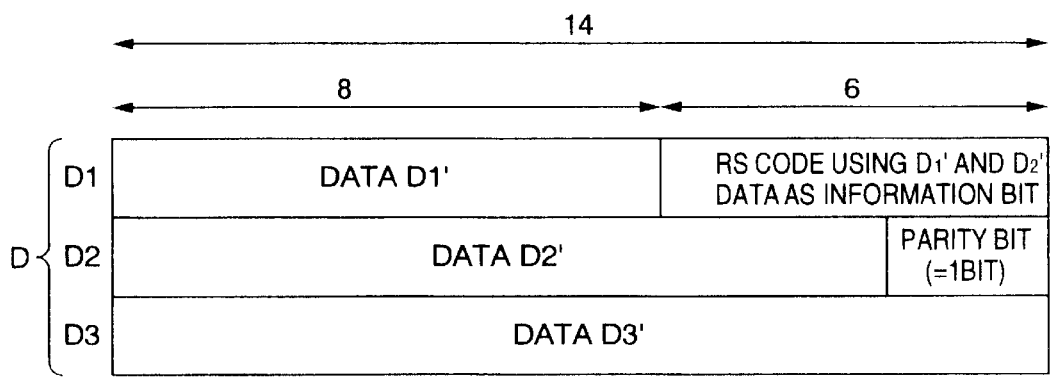
FIGS. 15A, 15B show still another structure of the block structure of the concatenated codes obtained by first coding.
Figure 15B:
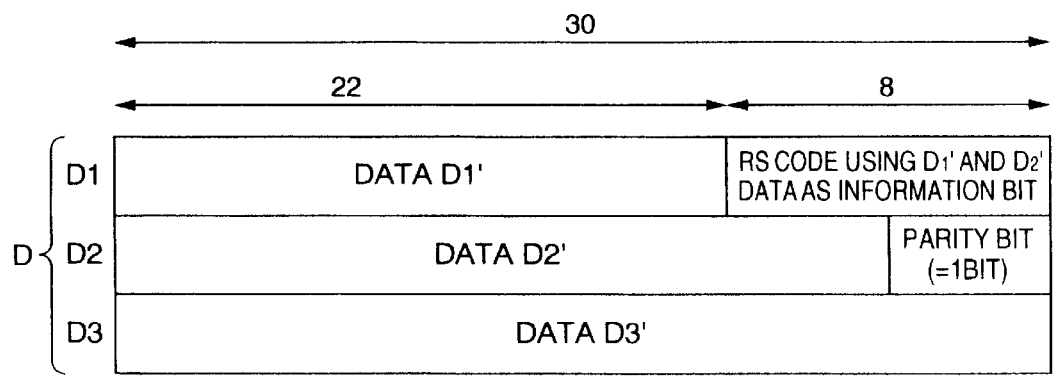

In the example shown in FIG. 15A, one coded data block (recording block) comprises 3×14 bits, and in the example shown in FIG. 15B, one recording block comprises 3×30 bits. Naturally, the structure shown in FIG. 15B has a higher code rate, which is "0.9".

Figure 16:
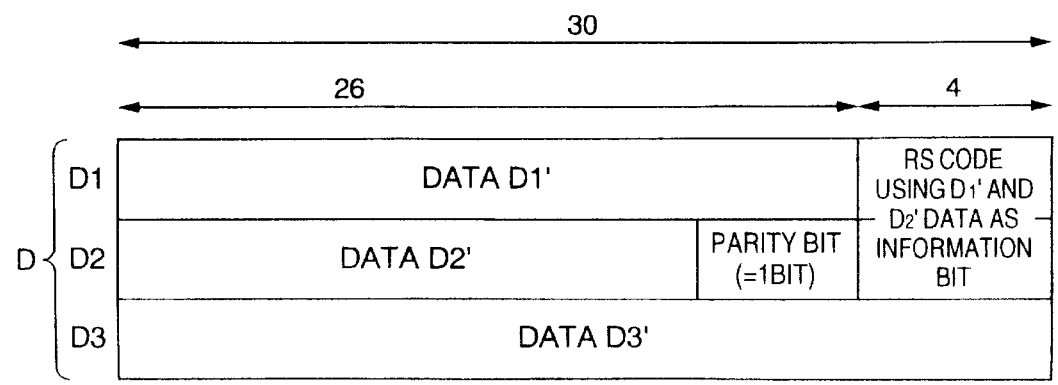
FIG. 16 shows still another example of the block structure of the concatenated codes obtained by first coding.

FIG. 16 shows an example wherein the insertion position of the RS code is changed in the block construction of FIG. 15B.

Figure 17:
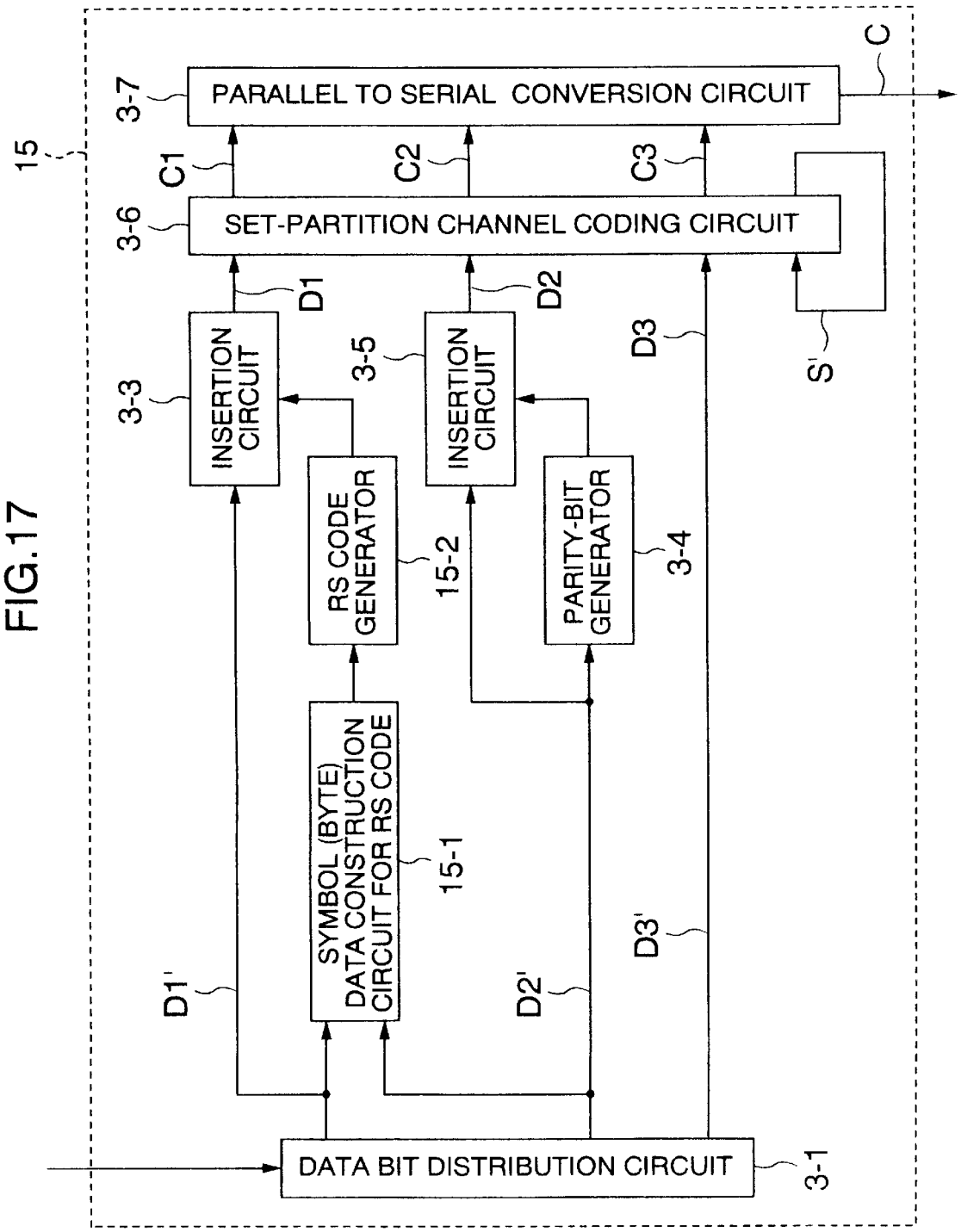
FIG. 17 shows an example of a channel coder suitable for the concatenated codes shown in FIGS. 15 and 16.

FIG. 17 shows an example of the signal processing circuit corresponding to the coding data blocks shown in FIGS. 15 and 16. The same reference numerals are used in this drawing as in FIG. 1 and their explanation will be omitted.

The input data A from the interface 2 is divided into the data series D1', D2' and D3' having a predetermined number of bits by the data bit distribution circuit 3-1.

The Reed Solomon code (RS code) constitutes one symbol by gathering a plurality of bits. In the case of the example shown in FIG. 15, three bits constitute one symbol and in the case of FIG. 16, four bits constitute one symbol.

A symbol construction circuit 15-1 for the RS code constitutes each symbol from the data series D1' and D2'. The output signal from the symbol construction circuit 15-1 for the RS code is subjected to RS coding by an RS code generator 15-2, and the resulting check code is added to the data series D1' by the insertion circuit 3-3 to constitute the data series D1. The other circuit operations of FIG. 17 are the same as those of FIG. 1, and the channel code C can be obtained from the parallel-to-serial conversion circuit 3-7.

Figure 18:
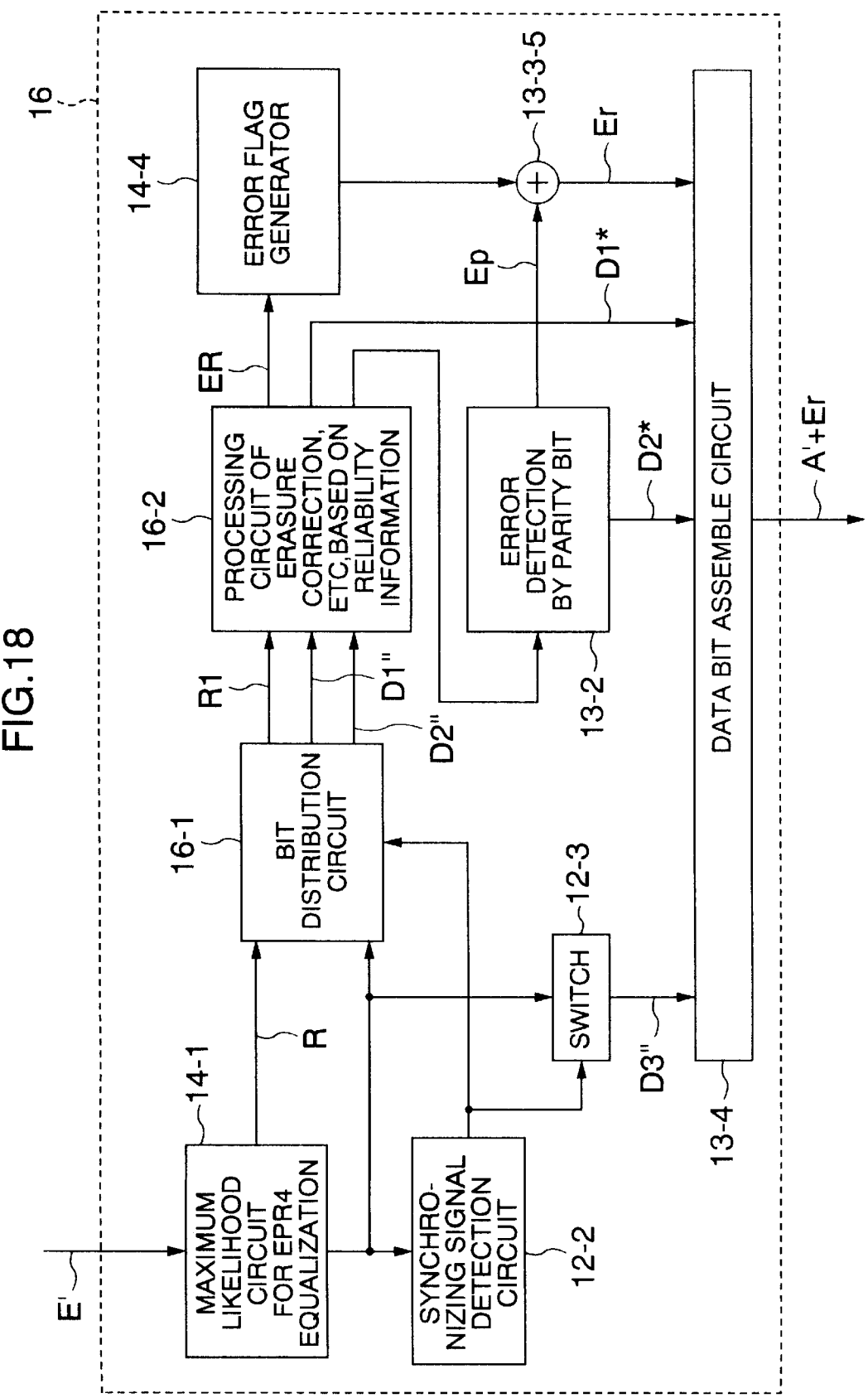
FIG. 18 shows an example of the playback decoding circuit corresponding to FIG. 17.

FIG. 18 shows one example of the decoding circuit corresponding to the coding data blocks shown in FIGS. 15A and B or FIG. 16. The basic concept of the decoding circuit shown in this drawing is the same as that of FIG. 13, and error correction can be executed efficiently on the basis of the reliability information.

The bit distribution circuit 15-1 and the processor circuit 15-2 are so constituted as to correspond to the code construction of FIGS. 15 and 16. Since the other constituents are the same as those in FIG. 13, their explanation will be omitted.

The circuit operation of the processor circuit 15-2 will be explained with reference to FIG. 19 which shows the detailed circuit construction. The basic operation is the same as that of FIG. 14.

The reliability information R1 is compared with the reference value by the comparator 14-3-2 an the comparator output represents the position of the decoded data having lower reliability. The output of the comparator is counted by the counter 14-3-3 and the number of positions having lower reliability can be obtained.

The symbol for the RS code is constituted from the tentative decoded data D1" and D2" by the symbol construction circuit 16-2-1 in the same way as at the time of recording. When the count value outputted from the counter 14-3-3 is not greater than "1", that is, when the bit error is not greater than 1 (since the reliability information R1 is obtained in the bit unit, the reliability information R1 can be paraphrased into "the number of bit errors which might exist"), error correction of one symbol can be made by the inserted RS code, and a corrected data series can e obtained by executing random error correction.

When the count value is "2", on the other hand, it is expected that the bit errors are dispersed at two positions. Therefore, erasure correction is made by utilizing the error expected position information represented by the output of the comparator 14-3-2. When the count value is "3" or more, a correction error might occur by using this RS code. Therefore, error correction by the RS code is given up but the output of the delay circuit 16-2-4 is employed.

The switch 16-21-5 selects one of these three outputs in accordance with the count value. The output of the switch 16-2-5 is supplied to a D1/D2 series separation circuit 16-2-6, and the decoded outputs D1* and D2* corresponding to the data series D1 and D2 are separately outputted. Here, because the correction processing is applied to D1" and D2", the tentative decoded outputs D1* and D2* are expressed by separate symbols.

Figure 19:
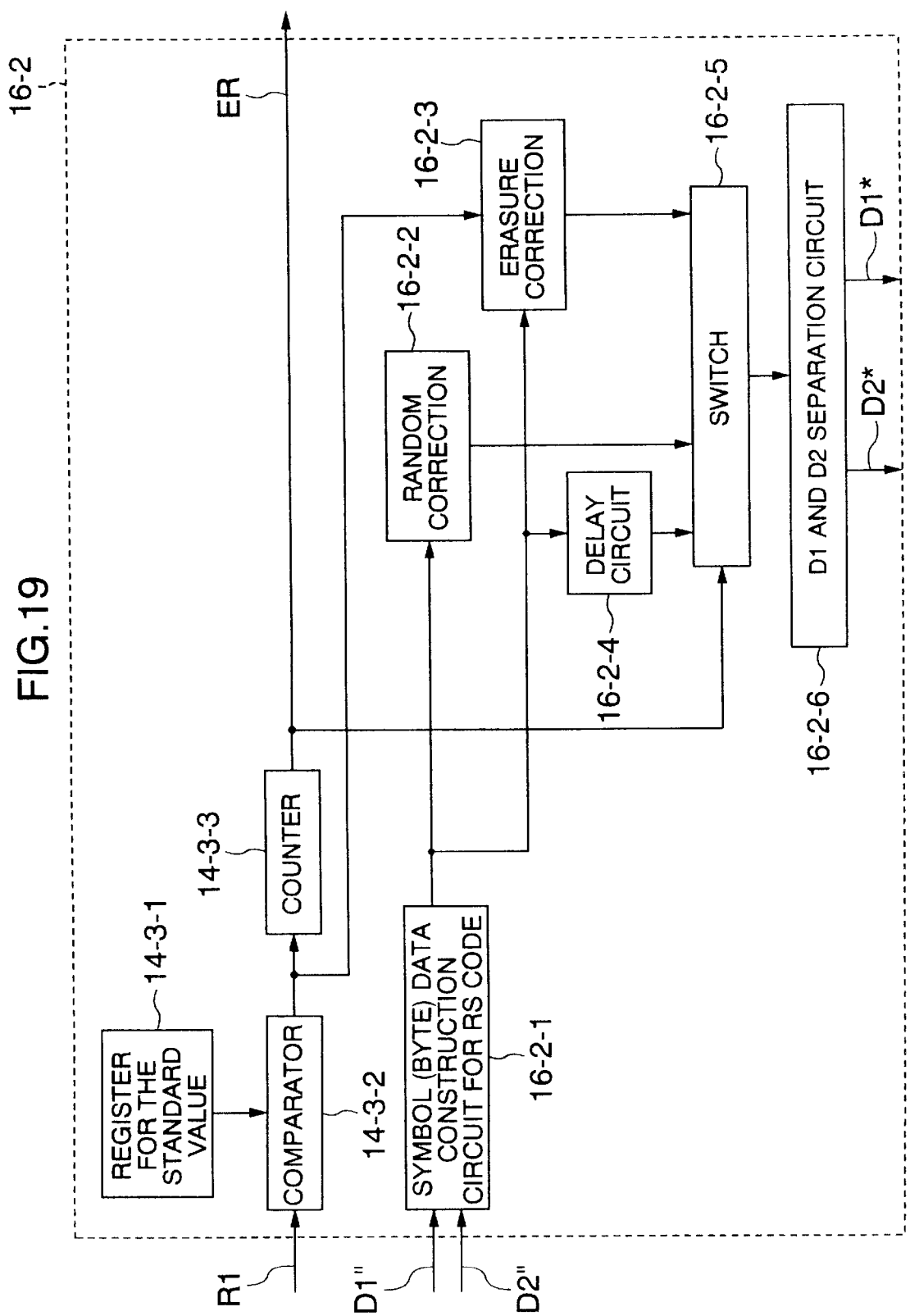
FIG. 19 shows the detail of an error correction circuit 16-2 in FIG. 18.

As can be appreciated from the circuit construction shown in FIG. 19, the decoding circuit 16 provides the decoded outputs D1* and D2* to which the error correction processing is applied. Since these outputs are the decoding results having high reliability, a decoded output having high reliability can be obtained for the data series D3, too, by operating the EPR4 maximum likelihood circuit by using these outputs as the definite decoding results.

Figure 20:
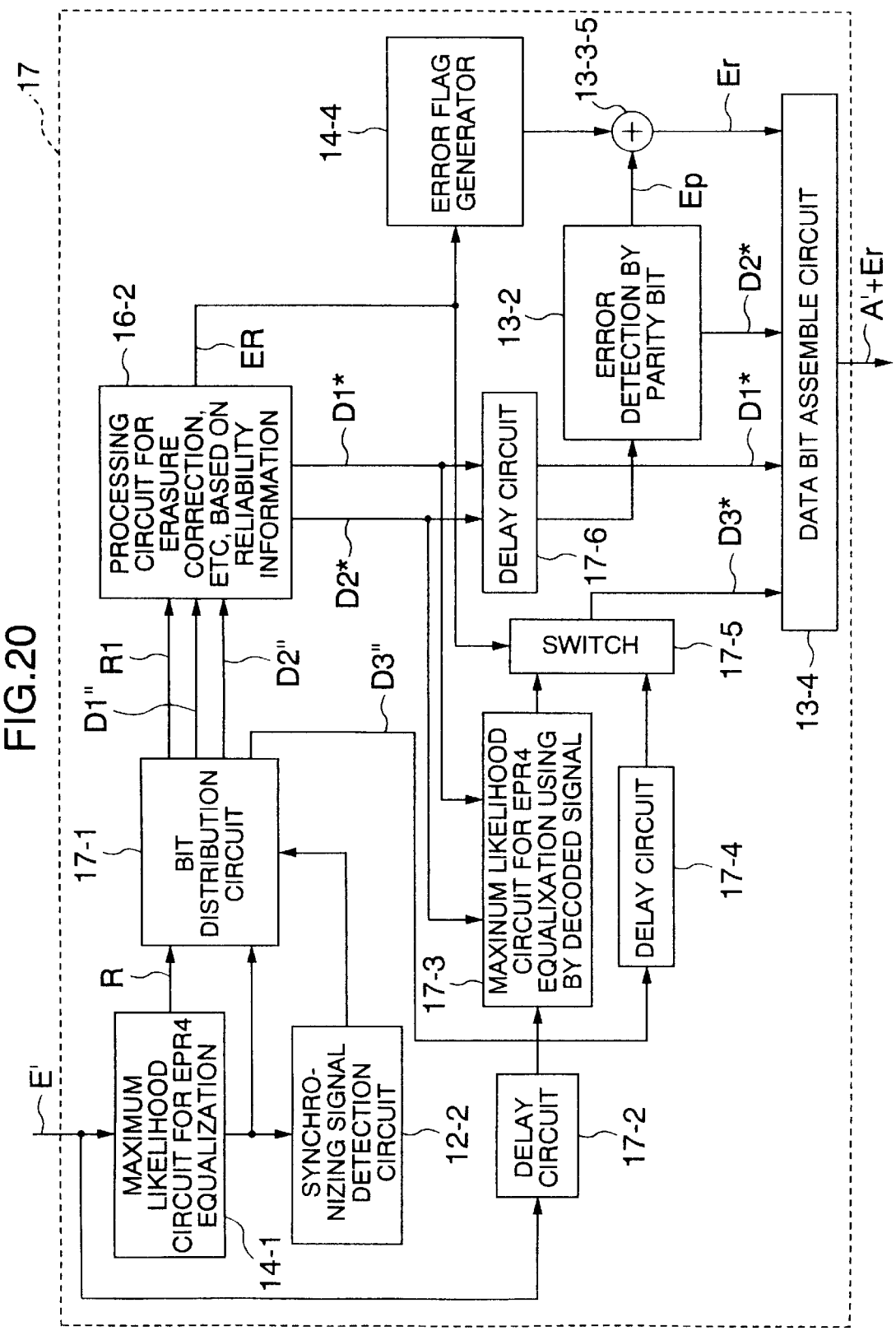
FIG. 20 shows another example of the playback decoding circuit corresponding to FIG. 17.

In FIG. 20, the former half of the decoding process is similar to that of FIGS. 18 and 19. However, it is different from FIG. 18 in that the bit distribution circuit separates and outputs D3", too, in addition to its output function of the reliability information R1 and the tentative decoded results D1" and D2".

The equalization output E' obtained from the delay circuit 17-2 is inputted to the second EPR4 ML circuit 17-3. The second ML circuit 17-3 is changed so that it can employ the decoded results D1* and D2* after the correction processing as the decoding results of the data series D1 and D2. In other words, though the normal ML circuit is so designed as to select the decoded output having the minimum value of the path metrics, the ML circuit 17-3 compulsively selects the path to which definite decoding is applied, leaves only the path connected to its decoding output and compulsively discards other paths.

The function effectively operates when ML decoding of the data series D3 is erroneously processed by the first stage ML circuit 14-1 due to the noise mixing with D1 or D2, or both, and can execute correct ML decoding of the data series D3. When the data series D1 and D2 contain a large number of errors from the beginning, however, the possibility is high that the erroneous processing is carried out by the second ML circuit 17-3, too. Therefore, the original data series D3" outputted from the delay circuit 17-4 is employed.

The switch 17-5 selects one of the two decoding results outputted from the ML circuit 17-3 and from the delay circuit 17-4 in accordance with the error information ER of the processing circuit 16-2 and supplies it as the decoding result D3* to the data bit assembly circuit 13-4. After time adjustment is made for the data series D1* and D2* with the data series D3* by passing them through the delay circuit 17-6, they are inputted to the data bit assembly circuit 13-4. The error flag Er is the same as in FIGS. 13 and 18.

Although several embodiments of the present invention, and various possible modifications thereof, have thus been described, the foregoing description demonstrates the most typical error correction codes. Therefore, error correction codes other than those described herein can be applied to coding by the concatenated code according to the present invention. As to the size of the recording block, too, other values than those of the foregoing embodiments can be employed in accordance with given recording apparatuses. Although the foregoing embodiments are based on the EPR4 equalization, partial response systems other than EPR4 can be applied to the present invention. Most typically, for example, a partial response system in which "1, 1, 0, −1, −1" is allowed to correspond to the recording pulse "1", can be applied.

The write-and-read system by the concatenated code according to the present invention is particularly effective for small magnetic disk apparatuses using a disk size of not greater than 3.65 in., but effectiveness of the present invention is in no way limited by the disk size.

Because coding and decoding of the channel codes in the present invention is fundamentally based on the digital signal processing, the design of the encoders 3 and 15 and the decoders 12 to 14, 16 and 17 is easy, and the LSI configuration can be easily attained by applying the Bi-CMOS process or the CMOS process which is advantageous from the aspects of power consumption and integration, for example.

As is obvious from the foregoing description, the present invention generates the channel code series suitable for partial response with inter-symbol interference of three or more bits and can accomplish high density digital magnetic recording. Because the present invention generates the code series having a large Euclidean distance inclusive of a Hamming distance, the present invention can execute decoding with high reliability.

What is claimed is:

1. A digital recording method comprising:

a first coding step of distributing serially digital data to be recorded in such a manner as to constitute n (where n is 2 or more) data series each having an inherent bit length, arranging each of said data series to the same bit length by adding an coding bit or bits to at least one of said data series having a short bit length, and serially generating n-bit parallel data by outputting one bit each from said n data series; and a second coding step of converting n-bit input data obtained from said first coding step to n-bit channel codes determined by the bit pattern of said input data and by the state of channel codes of a plurality of bits that have been already converted;

wherein the conversion rule of said second coding step associates the channel codes in such a manner that a partial response equalization output of each of said channel codes, which takes inter-symbol interference of a least 3 bits into consideration, has an Euclidean distance of at least 16 for each combination of two bit patterns having a predetermined Hamming distance at bit positions corresponding to said data series not having the coding bit or at bit positions corresponding to said data series having the shortest coding bit length, for those bit patterns which said n-bit input data can take.

2. A digital recording method according to claim 1, wherein said n-bit channel code obtained by said second coding step is converted to serial data in a predetermined bit sequence and is then supplied to write means of a recording medium.

3. A digital recording method according to claim 1, wherein an error correction code having a Hamming distance of at least 4 is added to one of said n data series in said first coding step.

4. A digital recording method according to claim 1, wherein said digital data is distributed into three data series so that data series obtained by adding first coding information having a first bit length to said first data series and data series obtained by adding second coding information having a second bit length to said second data series have the same bit as said third data series, and coding bits are added to said first and second data series, respectively.

5. A digital recording method according to claim 4, wherein said first coding information is a Hamming code corresponding to the digital data distributed to said first data series and said second coding information is a parity bit corresponding to said digital data distributed to said second data series.

6. A digital recording method according to claim 4, wherein said first coding information is a Reed Solomon error correction code corresponding to said digital data distributed to said first and second data series, and said second coding information is a parity bit corresponding to said digital data distributed to said second data series.

7. A digital recording method according to claim 4, wherein said first coding information is a part of a Reed Solomon error correction code corresponding to said digital data distributed to said first and second data series, and said second coding information is a parity bit corresponding to said digital data distributed to said second data series and the remaining part of said Reed Solomon error correction code.

8. A digital recording method according to claim 1, wherein said digital data is distributed into two series in said first coding step so that data series obtained by adding first coding information of a first bit length corresponding to the digital data of said first data series to said first data series and data series obtained by adding second coding information of a second bit length corresponding to the digital data of said second data series to said second data series have mutually the same bit length, and coding bits are added to said first and second data series.

9. A digital recording method according to claim 8, wherein said first coding information is a Hamming code and said second coding information is a parity bit.

10. A digital recording method according to claim 1, wherein said digital data is distributed into three series in said first coding step so that data series obtained by adding first coding information having a first bit length corresponding to the digital data of said first data series to said first data series, data series obtained by adding a second coding information having a second bit length corresponding to the digital data of said second data series to said second data series and data series obtained by adding a third coding information having a third bit length corresponding to the digital data of said third data series to said third data series have mutually the same bit length, and a coding bit is added to each of said data series.

11. A digital recording method according to claim 10, wherein one of said first, second and third coding information is a Reed Muller code.

12. A digital recording method according to claim 10, wherein one of said first, second and third coding information is a convolutional code.

13. A digital recording method according to claim 10, wherein one of said first, second and third coding information is a Hamming code.

14. A digital recording method according to claim 10, wherein another of said first, second and third coding information is a parity bit.

15. A digital recording method according to claim 1, wherein said digital data to be recorded is given in the form in which a synchronizing signal is inserted for each predetermined data length, and said digital data containing synchronizing information mixed therein in time series is distributed into said n data series in accordance with the input sequence, in said first coding step.

16. A digital recording method according to claim 1, wherein said digital data to be recorded is given in the form in which an error correction code and a synchronizing information are inserted for each predetermined data length, and digital data in which said error correction code and said synchronizing information exist in mixture in time series is distributed in accordance with the input sequence in said first coding step.

17. A method of writing and reading digital data to and from a magnetic recording medium, including, in a signal processing process thereof at the time of writing:

a first coding step of distributing digital data to be recorded in such a manner as to constitute n (where n is 2 or more) data series each having an inherent bit length, arranging said data series to the same bit length by adding a coding bit or bits to at least one of said data series having a short bit length, and serially generating an n-bit parallel data by outputting one bit each from said n data series; and a second coding step of converting n-bit input data obtained from said first coding step to n-bit channel codes determined by the bit pattern of said input data and by the state of channel codes of a plurality of bits that have been converted already;

wherein the conversion rule of said second coding step associates the channel codes in such a manner that a partial response equalization output of each of said channel codes, which takes inter-symbol interference of at least 3 bit into consideration, has an Euclidean distance of at least 16 for each combination of two bit patterns having a predetermined Hamming distance at bit positions corresponding to said data series not having a coding bit or at bit positions corresponding to said data series having the short coding bit length, for those bit patterns which said input data can take;

said method further including, in a signal processing process thereof at the time of reading:

an equalization step of executing partial response equalization for a read signal from said recording medium;

a decoding step of converting said equalized signals to a bit string by maximum likelihood detection, corresponding to inverse conversion of said second coding step;

a step of separating said decoded bit string into a plurality of data series corresponding to the result of said first coding;

a coding bit processing step of removing the coding bit from said data series to which the coding bit is added by said first coding step at the time of writing, and executing an error correction processing utilizing the coding bit for those bit series for which error correction can be made; and a step of assembling the data series after the removal of said coding bit by said processing step, and the data series separated by said separation step for said data series to which said coding bit is not added at the time of writing, into one digital data string.

18. A digital write-and-read method according to claim 17, wherein when any uncorrectable error exists is said error correction step, an error indication signal is generated.

19. A digital write-and-read method according to claim 17, wherein said separation step is executed on the basis of the synchronizing signal extracted from the bit string decoded by said decoding step.

20. A method of writing and reading digital data to and from a magnetic recording medium, including, in a signal processing process thereof at the time of writing:

a first coding step of distributing digital data to be recorded in such a manner as to constitute n (where n is 2 or more) data series each having an inherent bit length, arranging said data series to the same bit length by adding a coding bit or bits to at least one of said data series having a short bit length, and serially generating an n-bit parallel data by outputting one bit each from said n data series; and a second coding step of converting n-bit input data obtained from said first coding step to n-bit channel codes determined by the bit pattern of said input data and by the state of channel codes of a plurality of bits that have been converted already;

wherein the conversion rule of said second coding step associates the channel codes in such a manner that a partial response equalization output of each of said channel codes, which takes inter-symbol interference of at least 3 bits into consideration, has an Euclidean distance of at least 16 for each combination of two bit patterns having a predetermined Hamming distance at bit positions corresponding to said data series not having a coding bit or at bit positions corresponding to said data series having the shortest coding bit length, for those bit patterns which said bit input data can take;

said method further including, in a signal processing process thereof at the time of reading:

an equalization step of executing partial response equalization for a read signal from said recording medium;

a first decoding step of reproducing a data series to which said coding bits are not added at the time of writing, by executing maximum likelihood detection for said equalized signals;

a second decoding step of reproducing a data series to which said coding bits are added by said first coding step, by executing maximum likelihood detection for said equalized signals by utilizing said coding bits; and a step of assembling said data series obtained by said first and second decoding steps.

21. A digital write-and-read method according to claim 20, wherein said first step converts said equalized signals to a bit string by executing maximum likelihood judgement and then extracts selectively a data series to which said coding bit is not added, from the resulting bit string, and said second decoding step separates the signal portion having said coding bit added thereto form said equalized signal and then converts the signal portion so separated to a bit string by executing maximum likelihood judgement.

22. A signal processing apparatus for digital recording, comprising:

first coding means for distributing serially digital data to be recorded in such a manner as to constitute n (where n is at least 2) data series each having an inherent bit length, arranging each of said data series to the same bit length by adding a coding bit or bits to at least one of said data series having a short bit length, and serially generating n-bit parallel data by outputting one bit each from said n data series; and second coding means for converting n-bit input data obtained from said first coding means to n-bit channel codes determined by the bit pattern of said input data and by the state of channel codes of a plurality of bits that have been converted already;

wherein said second coding means allocates the channel codes after conversion to those bit patterns which said n-bit input data can take so that a partial response equalization output of the respective channel code, which takes the inter-symbol interference of at least three bits into consideration, has an Euclidean distance of at least 4 for each combination of two bit patterns existing at a predetermined Hamming distance.

23. A signal processing apparatus for digital recording according to claim 22, which further comprises conversion means for converting the n-bit channel codes outputted in parallel from said second coding means to series data having a predetermined sequence, and wherein said series data is supplied to write means for a recording medium.

24. A signal processing apparatus for digital recording according to claim 22, wherein said first coding means includes means for distributing the digital data to be recorded to first, second and third data series so that each of said data series has an inherent bit length, first code operation means for generating first coding information having a first bit length from at least one of said data series and inserting it to the back of said first data series, and second code operation means for generating second coding information having a second bit length from at least one of said data series and inserting it to the back of said second data series, and wherein the bit length of each of said data series and the bit length of said coding information are associated so that the final bit of said third data series and the final bits of said first and second coding information are outputted in parallel with one another.

25. A signal processing apparatus for digital recording according to claim 24, wherein said first code operation means generates a Hamming code corresponding to the data content of said first data series, and said second code operation means generates a parity bit corresponding to the data content of said second data series.

26. A signal processing apparatus for digital recording according to claim 24, wherein said first code operation means generates a Reed Solomon error correction code corresponding to the data content of said first and second data series, and said second code operation means generates a parity bit corresponding to the data content of said second data series.

27. A signal processing apparatus for digital recording according to claim 22, wherein said first coding means includes means for distributing said digital data to first and second data series so that each of said data series has an inherent bit length, first code operation means for generating first coding information having a first bit length from said first data series and inserting it to the back of said first data series, and second code operation means for generating second coding information having a second bit length from said second data series and inserting it to the back of said second data series, and wherein the bit length of each of said data series and the bit length of each of said coding information are associated so that the final bits of said first and second coding information are outputted in parallel with one another.

28. A signal processing apparatus for digital recording according to claim 27, wherein said first code operation means generates a Hamming code and said second code operation means generates a parity bit.

29. A signal processing apparatus for digital recording according to claim 22, wherein said first coding means includes means for distributing the digital data to be recorded to first, second and third data series so that each of said data series has an inherent bit length, first code operation means for generating first coding information having a first bit length from said first data series and inserting it to the back of said first data series, second code operation means for generating second coding information having a second bit length from said second data series and inserting it to the back of said second data series, and third code operation means for generating third coding information having a third bit length from said third data series and inserting it to the back of said third data series, and wherein the bit length of each of said data series and the bit length of each of said coding information are associated so that the final bits of said first, second and third coding information are outputted in parallel with one another.

30. A signal processing apparatus for digital recording according to claim 29, wherein one of said first, second and third code operation means generates a Reed Muller code.

31. A signal processing apparatus for digital recording according to claim 29, wherein one of said first, second and third code operation means generates a convolutional code.

32. A signal processing apparatus for digital recording according to claim 29, wherein one of said first, second and third code operation means generates a Hamming code.

33. A signal processing apparatus for digital recording according to claim 29, wherein one of said first, second and third code operation means generates a parity code.

34. A magnetic write-and-read apparatus comprising a recording signal processing circuit for processing digital signals to be recorded on a magnetic recording medium and a playback signal processing circuit for processing signals reproduced from said magnetic recording medium, wherein:

said recording signal processing circuit comprises:
first coding means for distributing digital data to be recorded in such a manner as to generate n (where n is 2 or more) data series each having an inherent bit length, arranging said data series to the same bit length by adding a coding bit or bits to at least one of said data series having a short bit length and serially generating n-bit parallel data by outputting one bit each from said n data series; and
second coding means for converting the input data in the n-bit unit given from said first coding means to an n-bit channel code determined by the bit pattern of said input data and by the state of channel codes for a plurality of bits that have already been converted;
said second coding means allocating the channel code to those bit patterns which said n-bit input data can take so that a partial response equalization output of each of said channel codes, which takes inter-symbol interference of at least three bits into consideration, has an Euclidean distance of at least 16 for each combination of two bit patterns existing at predetermined bit positions and at predetermined Hamming distance; and wherein
said playback signal processing circuit comprises:
an equalization circuit for executing partial response equalization of the playback signals from said recording medium;
maximum likelihood decoding means for converting the output signals of said equalization circuit to a bit string by maximum likelihood judgement;
means for separating said decoded bit string into a plurality of data series corresponding to the result of said first coding;
equalization bit processing means for removing the coding bit from said data series to which the coding bit it added by said first coding at the time of recording, and executing an error correction processing for said bit series for which error correction is possible, by utilizing the coding bit; and
data bit assemble means for assembling said data series from which the coding bit is removed and which is obtained from said processing means, and said data series separated by said separation means for those of said data series to which the coding bit is not added at the time of recording, into one digital data string.

35. A magnetic write-and-read apparatus according to claim 34, wherein said coding bit processing means executes an error correction processing of said data series on the basis of said coding bit, and generates an error display signal when an uncorrectable error exists.

36. A magnetic write-and-read apparatus according to claim 34, wherein said maximum likelihood decoding means generates information representing reliability of the coding result, and said coding bit processing means executes the error correction processing of said data series in accordance with said reliability information.

37. A magnetic write-and-read apparatus according to claim 34, wherein said playback signal processing circuit includes synchronizing signal generation means for generating a synchronizing signal by using said bit string outputted from said maximum likelihood decoding means as an input, and said separation means separates a plurality of said data series from said decoding result on the basis of said synchronizing signal.

38. A signal processing apparatus for digital recording comprising:
  first coding means comprising means for distributing digital data supplied outside in a predetermined sequence, generating n (where n is 2 or more) data series each having an inherent bit length, outputting one bit each of said data series and serially generating n-bit parallel data, and means for generating a coding bit from the content of at least one of said data series and inserting said coding bit to a bit position of at least one of said data series having a short bit length at which data is insufficient;
  second coding means for converting the input data supplied in an n-bit unit from said first coding means to n-bit channel codes which are different depending on the state of said channel codes for a plurality of bits that have been already converted; and
  conversion means for converting the n-bit channel codes generated by said second coding means to a serial channel code string and outputting it;
  said second coding means allocating the channel codes to those bit patterns which said n-bit input data can take so that a partial response equalization output of each of said channel codes, which takes inter-symbol interference of at least 3 bits into consideration, has an Euclidean distance of at least 16 for each combination of two bit-patterns having a minimum Hamming distance at bit positions corresponding to said data series not having said coding bit or at positions corresponding to the data system having the shortest coding bit length.

39. A signal processing apparatus according to claim 38, wherein said first and second coding means are constituted as a semiconductor integrate circuit.

40. A signal processing apparatus for digital recording comprising:
  first coding means for executing coding so as to increase a Hamming distance for digital data to be recorded, and serially generating n (where n is 2 or more) bit parallel data;
  second coding means for converting the n-bit input data received from said first coding means to an n-bit channel code determined by the bit pattern of said input data and by the state of channel codes for a plurality of bits that have been already converted; and
  conversion means for converting the n-bit channel code outputted from said second coding means to a serial channel code string;
  said second coding means associating the channel code for those bit patterns which said n-bit input data can take so that a partial response equalization output of each of said channel codes, which takes inter-symbol interference of at least 3 bits into consideration has an Euclidean distance of at least 16 for each combination of two bit patterns having a predetermined Hamming distance and existing at bit positions corresponding to said data series not having the coding bit, or at positions corresponding to said data series having the shortest coding bit length.

41. A magnetic disk apparatus comprising a digital signal processing apparatus according to claim 40 and magnetic recording means for recording the serial channel code string outputted from said digital signal processing apparatus to a magnetic recording medium.

* * * * *